(12) United States Patent
Landis

(10) Patent No.: US 6,411,192 B1
(45) Date of Patent: Jun. 25, 2002

(54) METHOD AND APPARATUS FOR SENSING AND MEASURING PLURAL PHYSICAL PROPERTIES, INCLUDING TEMPERATURE

(75) Inventor: Donald G. Landis, Hollis, NH (US)

(73) Assignee: Lansense, LLC, Hollis, NH (US)

( * ) Notice: Subject to any disclaimer, the term of this patent is extended or adjusted under 35 U.S.C. 154(b) by 0 days.

(21) Appl. No.: 09/221,733

(22) Filed: Dec. 28, 1998

(51) Int. Cl.[7] .............................. H01C 3/04; H01C 7/02; H01C 7/04
(52) U.S. Cl. ...................... 338/25; 338/22 R; 73/204.17
(58) Field of Search .................................. 338/22 R, 23, 338/24, 25; 374/185; 73/204.17, 204.25, 204.11

(56) References Cited

U.S. PATENT DOCUMENTS

| | | | |
|---|---|---|---|
| 3,604,261 A | | 9/1971 | Olin |
| 3,673,538 A | * | 6/1972 | Faxon ......................... 338/25 |
| 4,031,499 A | * | 6/1977 | Brueckner et al. ............ 338/23 |
| 4,615,214 A | | 10/1986 | Burns |
| 4,750,356 A | * | 6/1988 | Sommer ....................... 73/189 |
| 4,890,494 A | | 1/1990 | Osbond |
| 5,402,111 A | * | 3/1995 | Hubbard, Jr. ............... 340/608 |

FOREIGN PATENT DOCUMENTS

DE          28 21 206          * 11/1979

OTHER PUBLICATIONS

Supplemental Catalog—Keystone Thermometrics Crop. St. Mary's, Pennsylvania 1996, pp. 31 and 32.

* cited by examiner

*Primary Examiner*—Elvin Enad
*Assistant Examiner*—Kyung S. Lee
(74) *Attorney, Agent, or Firm*—Robert G. Crooks

(57) ABSTRACT

A method and device, employing positive-temperature-coefficient material, for sensing plural properties of a fluid, such as temperature and flow rate. Can be used in a wind gauge or in a device for sensing position of mechanical elements such as valve diaphragms. Single sensor device, with energy and ohmic resistors, produces two voltages which completely characterize temperature and flow rate of fluid under study.

2 Claims, 15 Drawing Sheets

METHOD AND APPARATUS FOR SENSING AND MEASURING PLURAL PHYSICAL PROPERTIES, INCLUDING TEMPERATURE

BACKGROUND OF THE INVENTION

1. Field of the Invention

This invention relates to a sensor, associated circuitry, and method of operation for sensing, measuring and displaying one or more physical properties of a substance or medium such as a gas or liquid. Typically, one of the properties to be sensed and measured is temperature, although the applications of the invention are not limited to those in which temperature is one of the properties to be sensed and measured. Other properties and quantities to the sensing and measurement of which this invention is well suited are rate of flow, direction of flow, wind-chill factor, and position of a physical element or component.

The invention is especially well suited to applications in which the sensor comprises, at least in part, a positive-temperature-coefficient device (a "PTC device") formed from positive-temperature-coefficient ("PTC") material together with interfaces, resistors, and terminals of ohmic material. In most applications of the invention, the PTC material of the sensor device is "sectored" or divided into a plurality of zones which are electrically interconnected but which may be exposed to a medium whose temperature, rate of flow, or other property varies from place to place therewithin. Different zones of the PTC material are exposed to different respective values of such properties of the medium. But all zones are operated within the self-stabilizing mode of the PTC material, which tends to hold its temperature just above the "transition temperature" or "Curie point".

A remarkable feature of the invention is that it makes possible the sensing and measurement of more than one property or quantity of a substance or medium without using more than one sensing device. The method in accordance with the invention is directed to this remarkable feature. In order to facilitate the full comprehension of this method, it will be illustrated graphically as well as in the text of the following disclosure.

2. Description of the Prior Art

The prior art includes various devices for measuring the speed of the wind and of other gas flows. Sometimes, as in the so-called "hot-wire anemometer," the speed of the wind, gas or other medium is evaluated by the rate at which it abstracts heat energy from an electrical resistance wire to which electrical energy is being supplied at a measurable rate. The heat power dissipated to the wind, gas or other medium is substantially equal to the electric power supplied to the resistance wire in maintaining it at a constant temperature.

The hot-wire anemometer may measure the rate of speed of the wind or other gas flow, but it is not well adapted to measurement of the direction, and hence the velocity, of the wind or other gas flow. Moreover, it is thermally inefficient and has no inherent "multiplier" to impart "leverage" to the measurement of gas flow. Furthermore, it does not lend itself readily to combination with other elements to measure quantities such as "wind-chill factor."

For a few applications, the measurement of rate of flow alone is sufficient. But for many more applications, it is necessary to ascertain both the velocity of flow and the temperature of the medium undergoing measurement. Although those quantities are combined in the wind-chill factor, the usual situation requires that they be separately determined and displayed. In the patented art, we find the following references:

U.S. Pat. No. 4,890,494—Osbond et al, issued on Jan. 2, 1990, discloses a probe comprising multiple toroidal PTC disks having ohmic facings and connected together in parallel. Each of the disks is not divided into zones or sectors which are differently exposed to plural aspects of the atmosphere or other gas in which the probe is immersed. Since there is no such differential treatment of various portions of the probe, there can be no source of plural signals that would permit the evaluation of two or more distinct properties of the atmosphere, such as temperature and humidity, or temperature and velocity of flow.

U.S. Pat. No. 3,604,261—Olin discloses a multidirectional thermal-anemometer sensor. As illustrated in FIGS. 10 through 14 of the drawings of the Olin patent, one of his sensing elements is spherical, and is divided in three dimensions like the sections of an orange in order to give a three-dimensional velocity-vector indication. But the sensing element is covered with a thin film of a metal such as segmented platinum, rather than PTC material. And the film is said to be maintained at a constant elevated temperature by control systems 29 to 32, of which no further description is given. Clearly, the temperature is not maintained constant by the self-stabilizing mode of PTC material, which is not present in the anemometer sensor of Olin.

U.S. Pat. No. 4,615,214—Burns shows segmented sensors disposed around the periphery of a continuous electrode in order to determine direction of the wind around the azimuth. But the sensors are piezoelectric, rather than PTC. in their operative properties.

SUMMARY OF THE INVENTION

In view of the aforementioned inadequacies of the prior art, I have provided a sensor which is new in its concept and surprising in its capabilities. In its preferred embodiment, the sensor in accordance with my invention is built around a single tablet of positive-temperature-coefficient ("PTC") material to which are bonded, preferably on two sides, layers of ohmic resistive (or conductive) material. At least one of those layers of ohmic material is divided into sectors or zones. If the tablet of material is circular, the sectors may be divided along radial lines. On the other hand, if the tablet is essentially rectangular, the dividing lines may be transverse so as to produce, typically, three zones as defined by the divided layer of ohmic material.

Although the PTC material itself may be selectively reduced in cross section, it is not generally separated into disjointed pieces. And the layer of ohmic material bonded to one side of the PTC material is maintained continuous. In operation, this continuous layer, which may in turn be bonded to some other structure, is connected to a source of electric potential, preferably at a constant level.

It will be understood that the layers of ohmic material serve primarily to make electrical contact with the PTC material. In operation, the ohmic layer which is maintained continuous imparts to the "base" side of the PTC material an electric potential allowing current to flow through the PTC material. The divided ohmic layer, on the other hand, is in thermal communication with the substance or medium whose properties are to be sensed. That layer need be only substantial and conductive enough to couple the respective sectors or zones of the PTC material to respective different portions of the substance or medium, even though those portions may be spatially very close to one another.

The respective parts of the divided ohmic layer are electrically connected through resistive elements to a different electric potential. Although the resistive elements may be made variable for the purpose of adjustability, their primary purpose is to provide "tapping points" for reading out voltages determined by the currents through the respective resistive elements.

On the other hand, the respective parts of the ohmic layer, or the portions of the PTC material beneath them, are coupled thermally, through contact, to respective portions of the substance or medium whose properties are to be sensed and measured. Typically, the "substance or medium" is a fluid which either flows freely over its interface with the PTC material (e.g. the wind) or flows past it in a tube, pipe, or other channel which, with its contents, is thermally closely coupled to the PTC material.

Because of the energization of the "base" at a controlled level of potential, electrical currents flow from it through the respective sectors or zones of the PTC material and through their respective resistive elements to a different potential. The respective magnitudes of those currents are determined more by the "apparent resistances" of the PTC material than by the external resistive elements, which are small in resistivity.

The apparent resistance interposed to each such current is determined substantially, but not entirely, by the sector or zone of the PTC material which is its primary path of flow. And, for each incremental element of the PTC material, the resistance of that incremental element is determined by a "characteristic" curve which specifies its resistivity as a function of its temperature. That curve will be explained in the paragraphs which immediately follow.

For the purposes of this summary, it suffices to say that each element of the PTC material conducts a current determined by the voltage across it and by its resistance. Moreover, its resistance (because it is a PTC material) depends crucially upon its temperature. In turn, its temperature depends upon the rate at which it is transferring heat to the substance or medium which is undergoing measurement or other study, and which is thermally coupled to the PTC material.

Along a certain portion of the aforementioned characteristic curve of PTC material, located just above the temperature of the so-called "Curie point", a very small change in temperature produces a very large change in electrical resistance. Stated differently, the slope of that portion of the plot of resistance as a function of temperature is very steep. The location of that portion along the temperature scale can be adjusted by changing the ingredients of the PTC material.

Again for the purposes of this summary, the various sectors or zones of the PTC material in a sensor according to this invention can have different resistances because they have different rates of heat transfer to a thermally-coupled substance or medium which is characterized by different internal temperatures. Accordingly, the currents passing through those respective zones or sectors and their respective external resistive elements develop different voltages across those external resistive elements.

The rates of heat transfer from the respective sectors or zones of the PTC material to the gas or other medium depend upon the temperature and rate of flow of the gas or medium. For each particular sensor in a particular environment, the temperature and rate of flow of the gas or other medium past the sensor produce a characteristic pair of voltages across the external resistive elements connected in series with the respective sectors or zones of the PTC material. Surprisingly, I have found a reciprocal relationship to prevail: For every pair of voltages measured across the external resistive elements connected to the PTC material, there is only one combination of temperature and rate of flow of the gas or other medium with which the PTC material is thermally coupled. This phenomenon will be explained in the detailed specification which follows.

BRIEF DESCRIPTION OF THE DRAWINGS

The invention summarized above will be described in detail in the following specification, which will be best understood if it is read while referring to the accompanying drawings, in which.

DETAILED DESCRIPTION OF THE PREFERRED MODE OF CARRYING OUT THIS INVENTION

Figure 1:
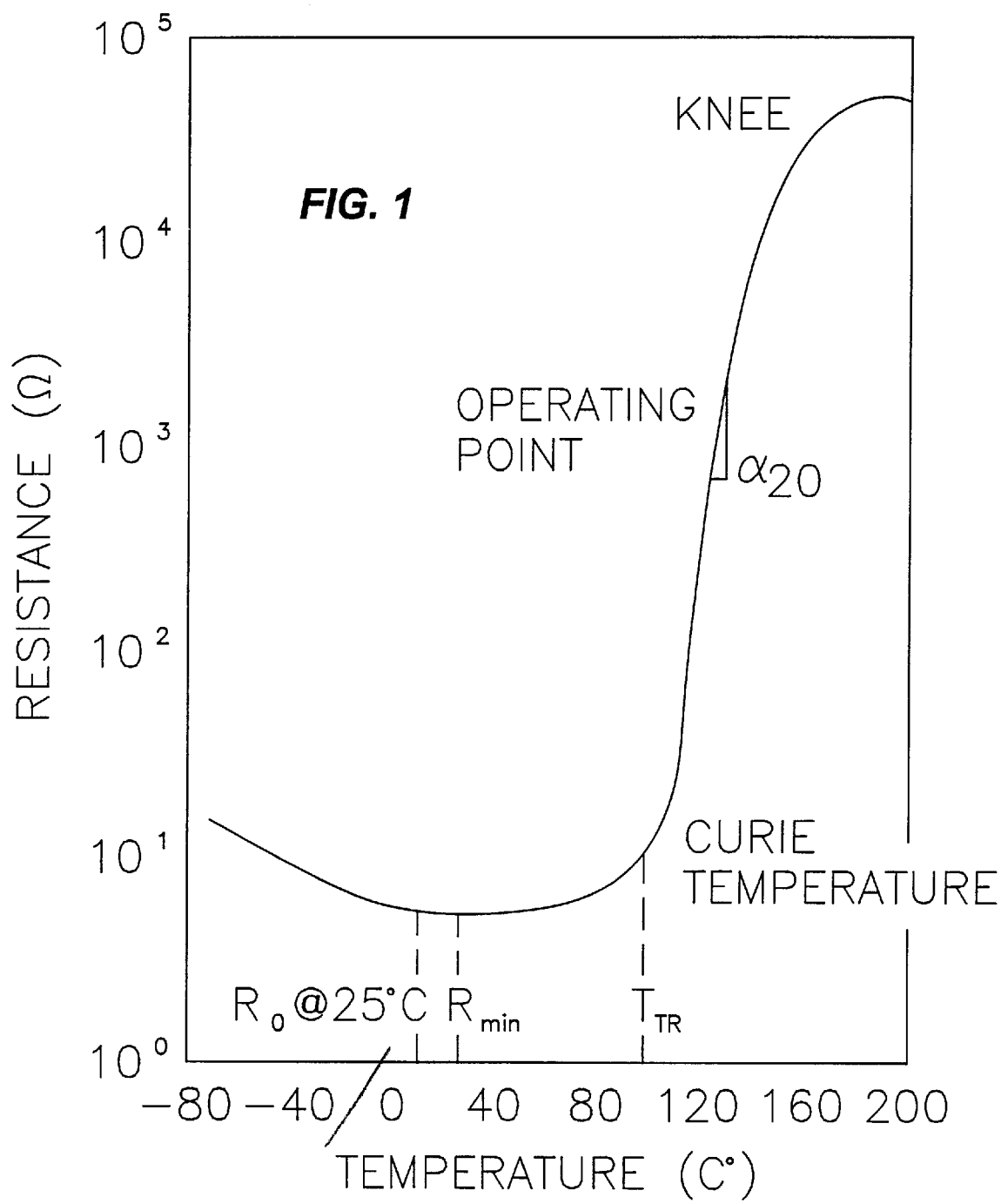
FIG. 1 is a plot of a typical relationship of resistance of a PTC material as a function of its temperature, both above and below the "Curie" transition temperature.

Referring first to FIG. 1 of the drawings, we see a plot of electrical resistance, shown on a logarithmic scale, of a positive-temperature-coefficient material per se, as marketed commercially by the Keystone Carbon Company of St. Mary's, Pennsylvania, among others. The plot shows how, as temperature increases, the resistance of the material dips slightly to a minimum value and then rather suddenly increases at a transition temperature commonly known as the "Curie Temperature". And the resistance then continues to increase at a very sharp rate with respect to the corresponding increase in temperature, at least up to a rather ill-defined "knee" of the curve, where it begins to level out. Within a certain narrow temperature range, the slope of the curve of resistance as a function of temperature is so steep that one is tempted to regard it as vertical. Of course, it is not truly vertical, but nevertheless a very small change in temperature produces a very large change in resistance, which is not fully dramatized by the logarithmic scale of FIG. 1.

The PTC material is likely to be primarily barium titanate, admixed with certain other titanates and compounds which can "adjust" the position of the "Curie temperature" from below the freezing point to well above the boiling point of water. Specifications of various PTC materials are available from Keystone and others.

Because of the spectacular non-linearity of performance of PTC material, it does not appear to be a likely candidate for measurement, which usually requires linearity over some usable range. But I have found that PTC material is indeed useful for measurement because of its self-regulating characteristic, at least on the steep portion of the plot of resistance as a function of temperature.

My invention is not limited to recognition of the utility of PTC material for measurement purposes. It also extends to discovery of the fact that a single sensor, composed of PTC material, is capable of sensing two parameters, such as temperature and rate of flow of a medium, and of outputting two signals which are expressive of both parameters. Further, and very surprisingly, it turns out that those two output signals uniquely characterize the temperature and rate of flow. Still further, I have discovered that PTC material is useful in sensing and indicating the direction of flow of fluids and, indeed, in sensing and indicating the direction or position of mechanical elements of apparatus such as valves. These surprising results will all be explained in the paragraphs which follow.

Figure 2:
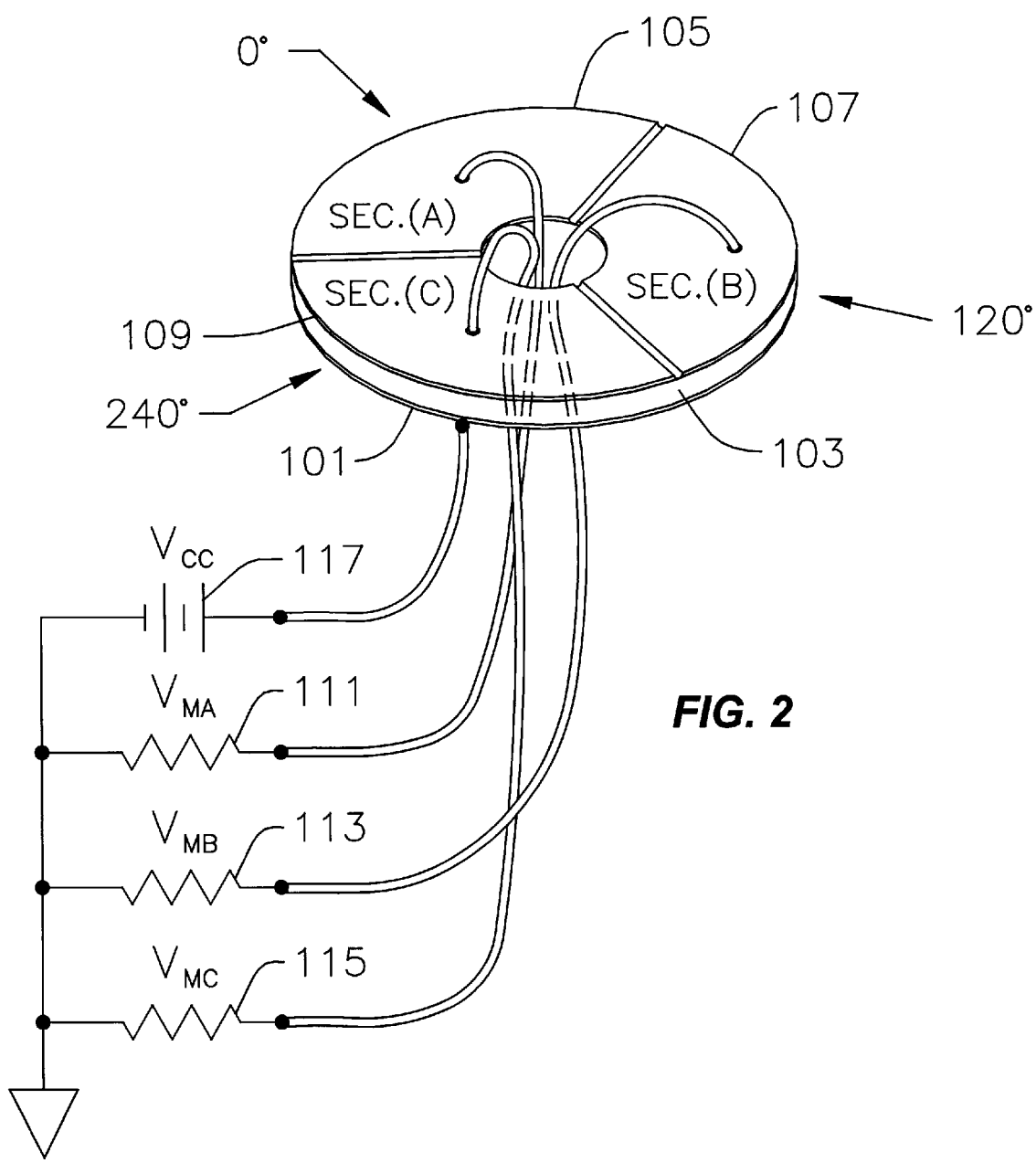
FIG. 2 is a schematic representation, partly in perspective, of the electrically-functional elements of a three-sectored "wind gauge" employing the principles of this invention.

Turning to FIG. 2 of the drawings, we see the electrical circuitry of a wind gauge, an embodiment of my invention which is least difficult to understand. PTC material is available from Keystone and others in various physical forms. Commonly, "tablets" of PTC material are available in rectangular form, or they can be purchased in circular form, like "pills." In either case, the titanate composition is likely to be covered on two sides by a layer of material which has an ohmic characteristic so as to spread an applied electric potential evenly over the surface of the PTC material. In the practice of the configuration illustrated in FIG. 2, a base layer 101 of ohmic material is left intact. The circular tablet 103 of PTC material is also preferably left intact.

However, the top layer of ohmic material is divided into a first sector 105, a second sector 107, and a third sector 109 which are electrically disconnected from one another. The respective sectors are connected to ground or other stable potential through a first resistive element 111, a second resistive element 113, and a third resistive element 115. Base layer 101 is energized by a voltage source 117.

In actual operation, the electrical circuitry shown in FIG. 2 may be modified by the addition of respective layers of thermal insulating material above and below circular tablet 103 while leaving its peripheral edge exposed. The thermal insulating material may typically comprise a plastic foam or a moldable plastic material. Although tablets of PTC material are sometimes referred to as "thermistors," that term does not appear to be adequately expressive of the function of the PTC material in the practice of this invention.

Now, as shown in FIG. 2, the sensor may be exposed to the wind or to other gas flow which either sweeps across its sectored upper surface or impinges only upon the peripheral edge of the sensor if it is thermally insulated above and below. In the interest of protection of the sensor from damage and deterioration, the insulated configuration may be preferable.

If the axis of the sensor is oriented vertically, wind from any of the three directions indicated in FIG. 2, or from directions intermediate those three directions, would impinge upon the edge of circular tablet 103. The wind would strike the portion of circular tablet 103 under one or two of the first, second, and third sectors more strongly than the portion under the remaining sector or sectors.

In the physical orientation illustrated in FIG. 2, the sensor is assumed to be exposed to wind varying in azimuth. Now, another similar sensor can be disposed nearby with its axis oriented horizontally. Thus, the second sensor is variously exposed to the wind (or other gas flow) depending upon the angle of elevation or declination of the wind or other gas flow. By using signals from both of the sensors, the complete vector velocity of the wind can be computed, including speed, azimuth, and inclination or declination. But now the mode of operation of the sensor per se must be explained.

If the portion of circular tablet 103 under one sector is to be maintained at essentially constant temperature (i.e. on the very steep slope of its characteristic curve,) the rate of heat acquisition by that portion must equal the rate of heat dissipation by that portion. For the purposes of this explanation, it will be assumed that the temperature of that portion of circular tablet 103 is maintained well above the temperature of the wind or other gas flowing past it, but not so high as to emit appreciable heat by radiation. Thus the rate of heat acquisition is limited to the electrical power supplied by voltage source 117, and the rate of heat dissipation is approximately equal to the rate of heat transfer from that particular portion of circular tablet 103 (under one sector) to the wind or other medium. The word "approximately" is used because there is some thermal conduction, as well as come electrical conduction, between portions of circular tablet 103 under adjacent sectors. In other words, the portion of circular tablet 103 under each sector cannot be treated as a totally-isolated element, either thermally or electrically. This fact will become more important in the discussion of FIG. 4 and FIG. 5 in following paragraphs of this specification.

Figure 4:
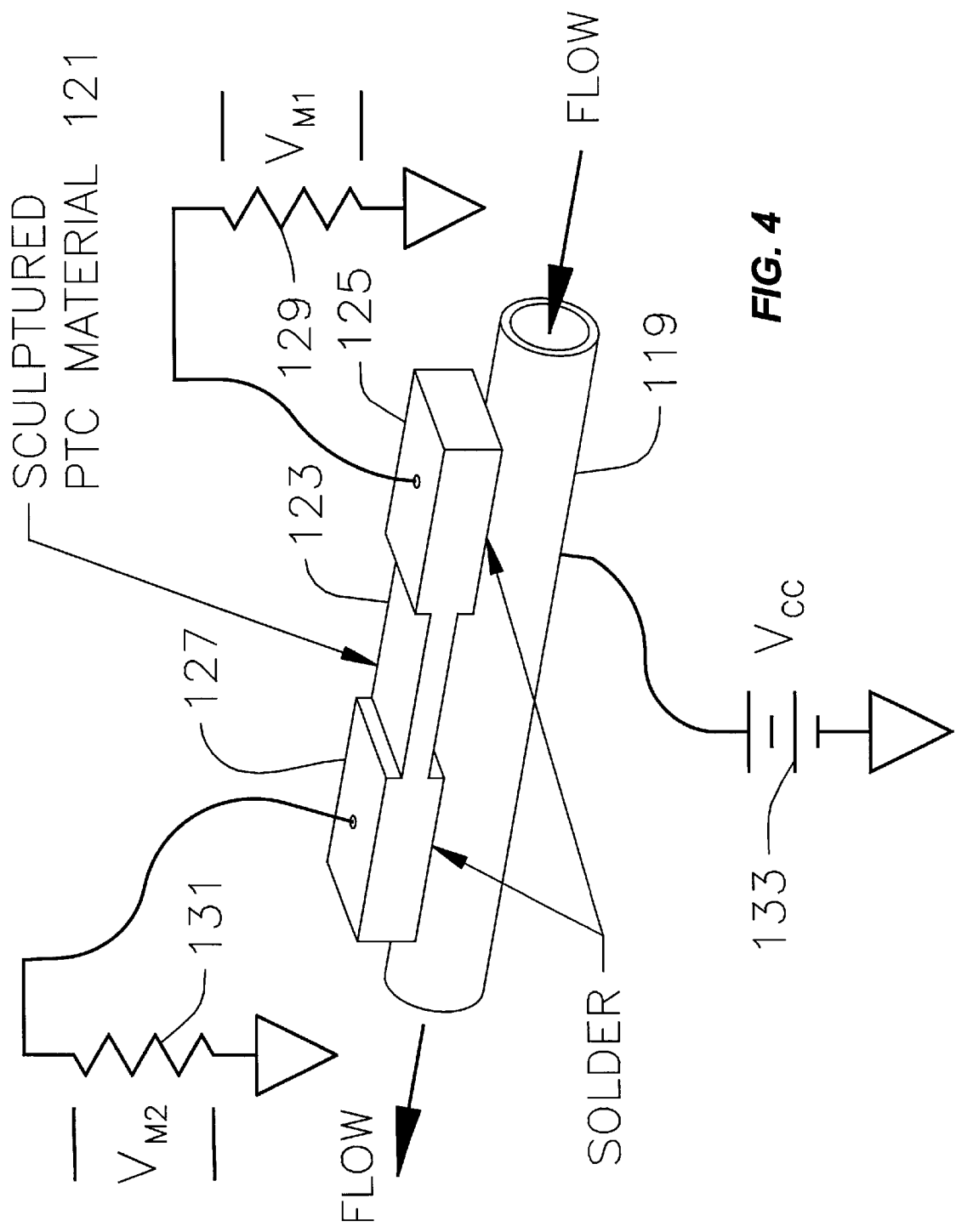
FIG. 4 is a schematic representation, partly in perspective, of a form of sensor, in accordance with this invention, in which the PTC material, as well as the ohmic layer, is "sculptured" and fastened to a tube through which a fluid is flowing.
Figure 5:
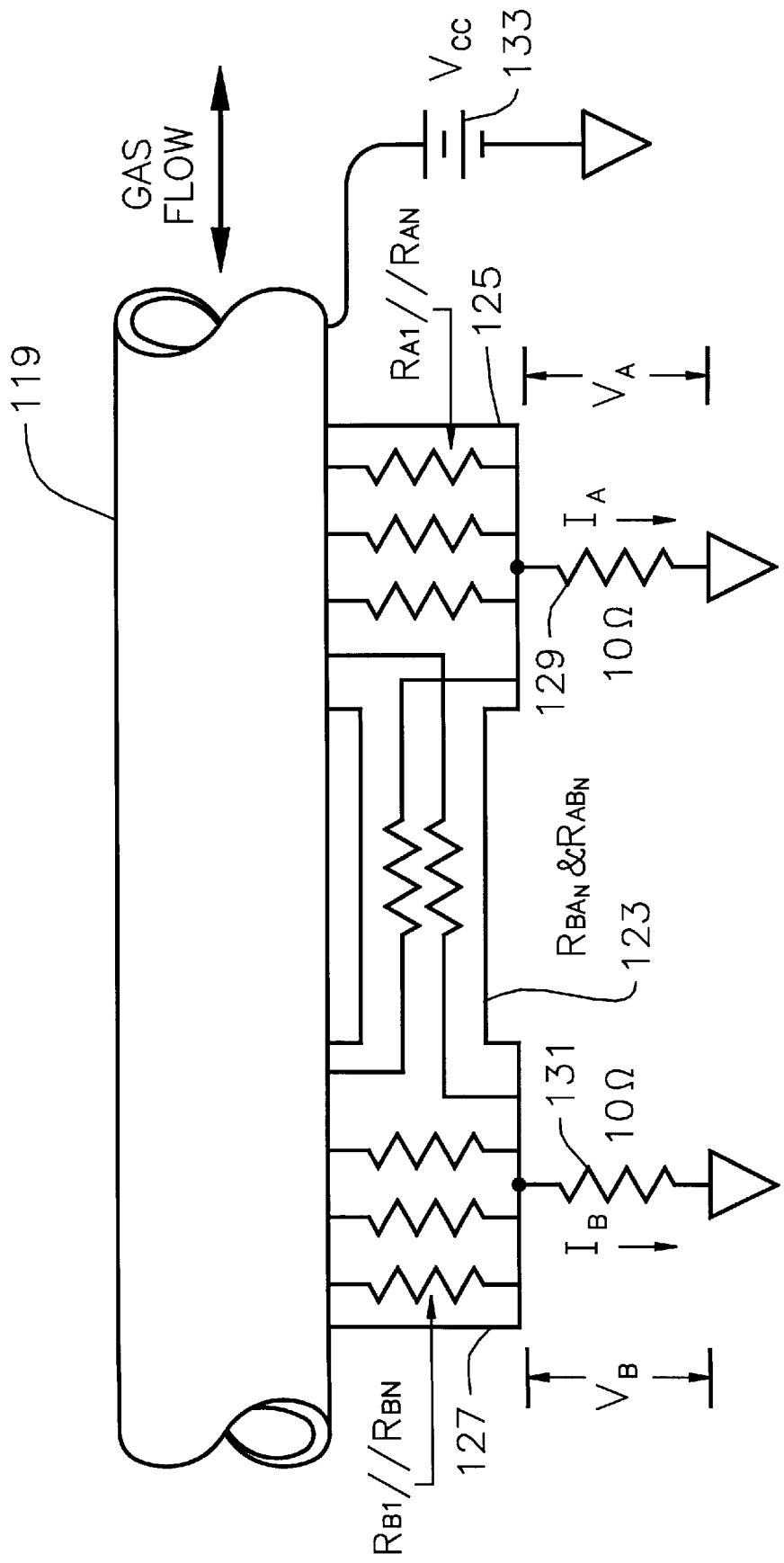
FIG. 5 is an electrical schematic of the sensor illustrated in FIG. 4, in which portions of the PTC material are represented as distinct resistors, and in which the cross coupling between different zones of the PTC material is made explicit.

To a first approximation, the following mathematical relationships describe the "power characteristics" of the portion of circular tablet 103 under each sector (and will also be applicable to the respective "zones" of the sensor to be described in the discussion of FIG. 4 and FIG. 5 of the drawings:)

$$VI = V^2/R_e \quad \text{equals} \quad q = \Delta T/R_t$$

$$\text{electric power input} \quad \text{thermal power dissipated}$$

$$\text{(in watts)} \quad \text{(also in watts)}$$

wherein:

V is the voltage drop across a sector, the portion of circular tablet 103 under it, and its associated resistive element;

I is the current through a sector and the portion of circular tablet 103 under it, and the current through the external resistive element connected to that sector;

$R_e$ is the series electrical resistance of a sector, the portion of circular tablet 103 under it, and its associated resistive element;

q is the approximate rate of heat flow away from a sector and the portion of circular tablet 103 under it, and into the wind or other fluid which is impinging upon that sector and that portion of circular tablet 103;

$\Delta T$ is the temperature differential between a sector—tablet structure and the wind or other fluid which is impinging upon that structure; and $R_t$ is the apparent thermal resistance for heat flowing away from a sector—tablet structure into the wind or other fluid which is impinging upon that structure.

Since the electric power input to a given sector—tablet structure must be approximately equal to the thermal power dissipated by that structure, we can set VI equal to $\Delta T/R_t$. Inasmuch as the resistance of each external resistive element 111, 113, and 115 is relatively low (e.g. ten ohms,) most of the electrical potential from voltage source 117 (e.g. 24 volts) appears across the respective sectors, tablet 103, and ohmic base layer 101. Accordingly, for the purposes of this approximate analysis, V may be treated as a constant. Likewise, any changes in apparent thermal resistance $R_t$ are likely to be small. Therefore, it turns out that the current through each sector and the portion of circular tablet 103 under it is roughly proportional to $\Delta T$, the temperature differential between a sector—tablet structure and the wind or other fluid which is impinging upon that structure. And, of course, the same current flows through the respective external resistive element connected in series with each sector—tablet structure, and develops a small voltage drop which may be measured.

When the voltage V is impressed across each sector—tablet structure, and the wind or other fluid flow impinges upon it from a given direction, the three (or more) structures are unequally cooled as thermal power flows from the structures to the wind or other fluid. If the sector—tablet structures were all identical, and if the wind velocity were zero, presumably the current flows through each of the sector—tablet structures and their respective external resistive elements would likewise be identical, and the voltage drops across the respective external resistive elements would be equal. But, first, it would be impossible to make all of the structures absolutely identical, so there is some inevitable imbalance. Second, and more of interest, when the wind velocity is other than zero, the thermal power flows away from the respective sector—tablet structures are unequal, and the current flows through them are unequal, thereby generating unequal voltage drops across the respective external resistive elements. Those voltage drops may serve as input signals to a computer or may be individually displayed, if desired.

How does the inequality among sector—tablet currents arise? And of what use is the inequality? These and other questions will be answered in the paragraphs which follow.

Again, when voltage V is impressed across each sector—tablet structure, a current flows which is determined by the self-regulating nature of the PTC material. If the wind velocity is zero or a low constant, and if other ambient conditions remain unchanged, the current flow settles at a "quiescent point" which is relatively high on the steep portion of the characteristic curve of the PTC material. The high resistance of the PTC material at that point limits the current. The external resistive element in series with the sector—tablet structure plays a relatively minor role in limiting the current because its resistance is low compared to that of the PTC material. The amount of electric power supplied to the structure is in stable balance with the amount of thermal power dissipated by the structure to the wind.

Figure 3:
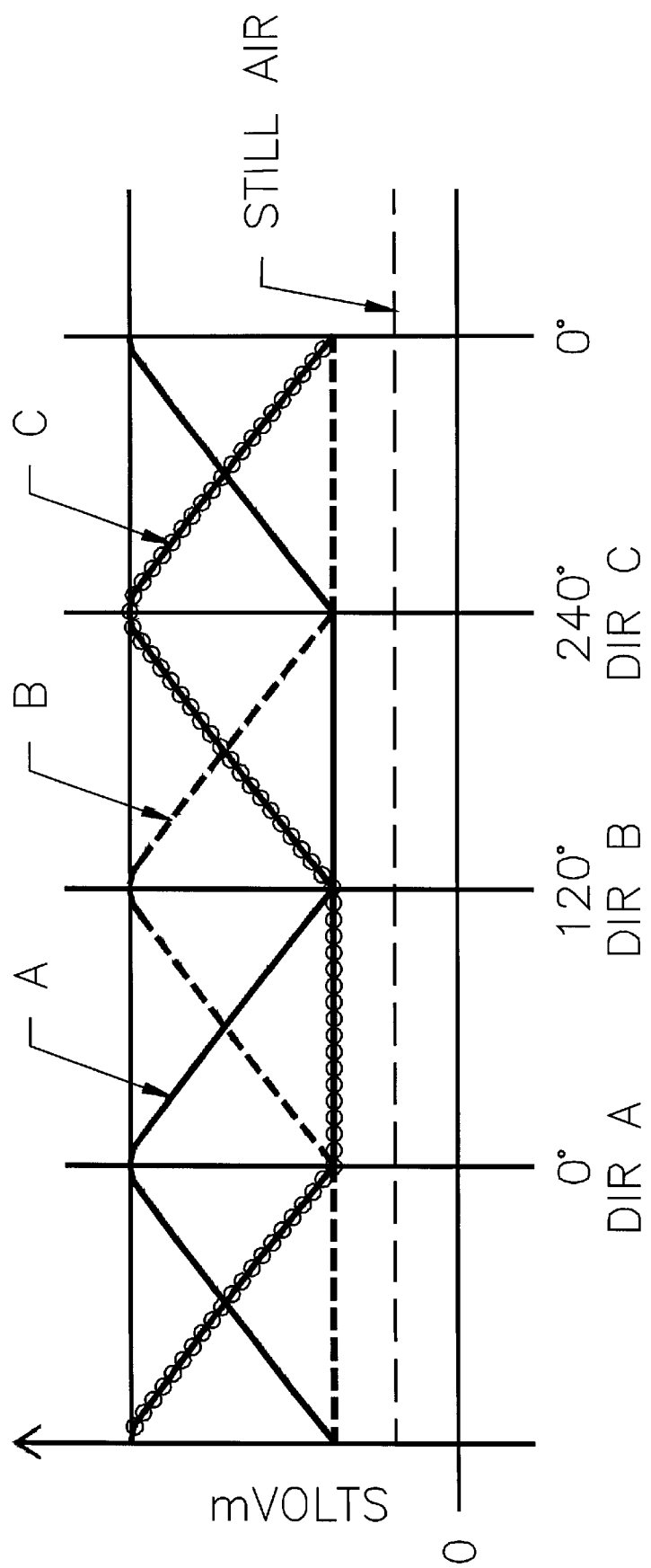
FIG. 3 is a representation of the output signals from each of the respective three sectors of the wind gauge of FIG. 2 as a function of the azimuthal direction of the wind impinging upon the gauge.

However, if the wind increases, the rate of heat dissipation on the windward side of the structure also goes up, and the temperature of the PTC material in that particular sector—tablet structure decreases slightly, thereby also lowering its resistance in accordance with the plot of FIG. 1, or a relationship similar to FIG. 1. Other typical relationships, for PTC materials having respective transition temperatures ranging from 30 degrees centigrade to 120 degrees centigrade, are shown in FIGS. 2–3B on page 32 of Section 2 of "PTC Thermistor Engineering Notes," a "Supplemental Catalog" of Keystone Thermometrics. A full copy of that Section is made of record in the file of this specification.

When the resistance of the particular sector—tablet structure decreases, the current through it and its respective external resistive element increases, thereby causing an increase in the voltage change across the external resistive element. The magnitude of increase of that voltage change is of interest both in itself and also relatively to the voltage changes across the respective resistive elements connected in series with the other two—or more—sector—tablet structures. The magnitude of increase is a measure of wind speed, while the relative increase with respect to the voltage changes for the other sector—tablet structures is a measure of wind direction. For each wind gauge oriented in a particular environment, the relationship between the plural voltage changes and the wind speed, direction and temperature can be determined by plotting a statistically-sufficient number of points and thereby characterizing the relationship between voltage changes, on the one hand, and wind speed, direction and temperature, which may in turn be combined to achieve the complete vector characterization of the wind at any particular time. In the following paragraphs, the effects of variations in air temperature of the wind will be discussed.

For the three-sectored wind gauge of FIG. 2, the millivolts, or output signals, from external resistive elements in series with each of the respective three sector—tablet structures are plotted in FIG. 3 as functions of wind direction. As will be noted from FIG. 3, those millivolts, or output signals, are "out of phase" with one another by approximately 120 degrees, the angle of separation between the respective sector—tablet structures of the wind gauge. The three component waves of FIG. 3 are not sinusoids. They are obtained empirically by plotting the millivolts against wind directions for a particular wind gauge in a particular environment. Once sufficient experience is compiled in plotting curves for given millivolts, computerized curves can be obtained for other combinations of millivolts, or output signals.

For the purposes of the foregoing discussion of the wind gauge of FIG. 2, there was a tacit assumption that the wind gauge impinging upon, or passing over, the gauge was not confined in its path. It was "free as air." But now, if we turn to the sensor illustrated in FIG. 4, we see a tube 119 which somewhat confines the flow of fluid through it. Again, the fluid could be either a liquid or a gas.

Attached to tube 119, and in good thermal contact therewith, is a piece of "sculptured" PTC material 121 having a reduced midsection 123 between a first end zone 125 and a second end zone 127. The end zones are faced on their top and bottom surfaces with thin layers of ohmic material. The respective bottom surfaces of first end zone 125 and of second end zone 127 may be bonded to tube 119 by solder or other means, which should be highly heat conductive. First end zone 125 is connected to ground (or other fixed potential) through a first resistor 129, while second end zone 127 is connected to ground through a second resistor 131. Tube 119 is connected to an electromotive force 133 having a controlled voltage $V_{cc}$, which energizes the sensor. A typical value of $V_{cc}$ is 24 volts, while a typical value for each of first resistor 129 and second resistor 131 is ten ohms. These values are not to be taken in a limiting sense.

Before there is a flow of gas (or liquid) through tube 119, the sensor is in a stable "quiescent" state in which both first end zone 125 and second end zone 127 transfer, through the wall of tube 119 to the gas or liquid therewithin, a roughly equivalent amount of thermal power. That power accordingly raises the temperature of the gas or liquid and maintains it at a temperature slightly higher than that of the environment in which the sensor is located (the "ambient" temperature).

But when the gas or liquid starts to flow through tube 119 in the direction indicated in FIG. 4, the gas or liquid in the tube opposite first end zone 125 quickly drops in temperature from its "quiescent" value and stabilizes at a level somewhat above the ambient. The rate of heat flow from first end zone 125 to the fluid (gas or liquid) in the tube is roughly proportional to the temperature difference ($\Delta T$) between them. Moreover, the electrical current flow through first end zone 125, and through first resistor 129, is also approximately proportional to that same temperature difference between first end zone 125 and the fluid in tube 119. The fluid in tube 119 opposite first end zone 125 is slightly warmer than it would be if first end zone 125 were not in thermal communication with tube 119.

As the fluid moves on, it is again slightly warmed because of the heat imparted to it by second end zone 127. But, the faster the fluid moves, the less it is warmed by that heat because the time of "exposure" to second end zone 127 is decreased. Of course, the warming effect of first end zone 125 is also decreased by that same flow of the fluid. But more heat is transferred to the fluid by first end zone 125 than by second end zone 127 because its temperature difference $\Delta T$ is greater. This is why the sensor can measure direction and rate of fluid flow.

The way in which the sensor can measure temperature, as well as rate of fluid flow, will be clarified by reference to FIG. 5 of the drawings, which is an electrical schematic of the sensor illustrated in FIG. 4. The three "zones" of the sensor are represented by discrete resistances. The resistances are "connected" between the top and bottom surfaces of the respective end zones, and also between the end zones through the "sculptured" portion of the sensor. The top surface of first end zone 125 is cross-coupled through reduced midsection 123 to the bottom surface of second end zone 127. And the top surface of second end zone 127 is cross-coupled through reduced midsection 123 to the bottom surface of first end zone 125. Thus the sensor is a single, rather than a multiple, device. It may be very small—less than one-half inch in length. And yet it senses properties at points in the fluid which are far enough apart to be meaningfully different in temperature. Moreover, the signals resulting from sensing those respective properties are not independent from each other. This observation is reminiscent of the cross coupling among the sectors of the three-sectored wind gauge of FIG. 2.

It will be worthwhile to explain further the mode of operation of the sensor illustrated in perspective in FIG. 4 and illustrated schematically in FIG. 5. In the first place, it is important to observe that the operating point (the "quiescent point") of the sensor is determined principally by the closeness of thermal coupling between the sensor and the tube or other conduit with which it thermally communicates. The closeness of thermal coupling depends, in turn, upon whether the fluid whose properties are being sensed is a gas or a liquid. If the fluid is a gas, more precautions must be taken in the close bonding of the sensor to the tube or other conduit through which the gas is flowing.

This observation warrants returning briefly to the description of the wind gauge of FIG. 2. In that configuration, the thermal insulation applied to the wind gauge partially determines the closeness of coupling between the gauge and the "wind." A "cap" of thermal insulation applied to the gauge increases its directional sensitivity, but decreases the closeness of coupling to the wind.

Returning to the electrical schematic of FIG. 5, let us consider first end zone 125. The electric current through it is roughly the quotient of $V_{cc}$, divided by the sum of the "apparent" resistance of first end zone 125 plus the external first resistor 129. As has already been noted, the resistances of the external resistors are low. They serve mainly as "tapping points" for measuring a flow of current through them. If desired, they could be made variable, but there is no particular reason to do so because their magnitudes are not such as to influence in an important way the current flowing through the respective "end zones". They are not "protective resistors".

The "apparent" resistance of first end zone 125 takes into account the cross coupling between first end zone 125 and second end zone 127. As aforementioned, the operating point of the sensor is set by the environmental conditions such as the nature of the fluid, the thermal closeness of the sensor to the tube or other conduit, the diameter of that tube or conduit, and the magnitude of the rate of fluid flow through the tube or other conduit.

Once again, when the flow of fluid begins and increases through the tube or conduit, the temperature of first end zone 125 decreases slightly, thereby causing its operating point on the plot of FIG. 1 to move down slightly as the electrical resistance of first end zone 125 decreases. Consequently, the current $I_A$ (as indicated on FIG. 5) increases because that current is limited principally by the apparent resistance of first end zone 125. And finally, the voltage $V_A$ (across first resistor 129 in FIG. 5) increases because of the passage of increased current therethrough.

Slightly lagging the decrease in temperature of first end zone 125, the temperature of second end zone 127 also decreases, but not so much as that of first end zone 125. The operating point of second end zone 127 moves down on the plot of FIG. 1, but not so much as that of first end zone 125. The current $I_B$ through second resistor 131 increases, but not so much as current $I_A$ through first resistor 129. The voltage $V_B$ across second resistor 131 increases, but not so much as the voltage VA across first resistor 129. These differences in electrical performance as between first end zone 125 and second end zone 127 give rise to the data which make possible the measurement of the rate of flow of fluid through the tube or conduit.

Now, if the temperature of the fluid flowing through the tube or conduit (or passing over or around the wind gauge of FIG. 2) increases, the temperature of first end zone 125 is less lowered by the dissipation of thermal power to the fluid because the temperature difference ΔT is smaller. Consequently, the operating point of first end zone 125 tends to shift downward less on the plot of FIG. 1, and the current through first end zone 125 and first resistor 129 is less. Moreover, the voltage $V_A$ across first resistor 129 is also less. A similar temperature-induced sequence of changes takes place across second end zone 127 and second resistor 131, but slightly lagging in time, and of slightly smaller respective magnitudes. This sequence of changes of performance, attributable to changes in temperature of the fluid, gives rise to the data which make possible the measurement of temperature of the fluid in the tube or conduit.

Again, these two items of data arise from a single sensor that has two distinct end zones which are nevertheless interconnected through a midsection of the same PTC material of which the end zones are composed. There are two signals, but they are interrelated. Increases in flow rate and temperature of the fluid produce opposite effects in the voltages $V_A$ and $V_B$ as measured across first resistor 129 and second resistor 131 respectively.

Finally, let us consider what takes place within the PTC material of the sensor. This will involve mentioning some typical values of electrical and thermal parameters. The values should be understood to be only illustrative and not limiting, in any sense.

A typical minimum value for the resistance of a "tablet" of PTC material is 50 ohms. On the plot of FIG. 1, the value of $R_{min}$, as given by Keystone, is more like ten ohms. In any event, the point of minimum resistance is at a temperature well below the transition point, or "Curie temperature." As aforementioned, the transition temperature, along with the location of the minimum resistance and the position of the steep portion of the curve as a function of temperature, can be adjusted over a wide range by varying the ratio among various titanates and other compounds in the composition of the PTC material.

Keystone has elected to designate as "α20" the slope of the plot at a point twenty degrees C above the transition point. The slope α 20 is indicated on the plot of FIG. 1. This is probably not the point of maximum slope of the plot, but it is nevertheless a point of steep slope. The "quiescent operating point" of the sensor could be at that point, or even above it. At that point, as indicated in FIG. 1, the resistance could be a thousand ohms, or even more.

If the quiescent operating point is set so that the resistance of the PTC material is one thousand ohms, the resistance of the material in operation will swing sharply downward. It could swing downward to 400 ohms, for instance. That value would represent "full-scale deflection" for maximum flow rate and minimum temperature. It would take advantage of the "leverage" or "high gain" or multiplicative effect afforded by the steepest portion of the plot of FIG. 1.

In general, I prefer to have the point of "full-scale deflection" occur at a resistance level which is between five and ten times the minimum value. This criterion would indicate that the resistance at "full-scale deflection" may desirably be between 250 and 500 ohms. But this is not a requirement. Again, the quiescent operating point will be set by the environment of the sensor on the tube or other conduit which confines the fluid to be measured. On the other hand, in the case of the wind gauge of FIG. 2, the quiescent operating point is set by the nature and amount of insulating material, and the amount of PTC material which is exposed to the wind, as well as the general temperature of that wind.

The slope of the plot of FIG. 1 can be as high as two hundred percent change in resistance per degree centigrade change in temperature. Again, this is the source of the "leverage" or "multiplication factor" or "gain" in the operation of this invention. This leverage is necessary because the differences of temperature between zones, or sectors, of the sensor are not very great. In measuring rate of flow of a fluid through a tube or conduit, it is not just the temperature differential ΔT between the sensor zone and the fluid which counts, but it is also the difference in ΔT between the first end zone and the second end zone. This difference can be very small indeed, although still measurable. If the voltage $V_{cc}$ of electromotive force 133 is 24 volts, for instance. and the range of currents through first resistor 129 and second resistor 131 is from 20 milliamperes to 60 milliamperes, the range of apparent resistance of the respective end zones would be from approximately 1,200 ohms, at zero or minimum flow, down to 400 ohms at maximum flow. These values are consistent with the range of "desirable" resistance levels set forth in the paragraph above.

For the multi-zone sensor of FIG. 4 and FIG. 5, it has been noted that the changes in currents $I_A$ and $I_B$ as functions of changes in the temperature of fluid flowing through tube 119 are small. Moreover, as the rate of fluid flow changes, the consequent changes in $I_A$ and $I_B$ take place in the same directions. A difference between those latter changes exists, but it is very small.

In going from minimum fluid-flow rate to maximum fluid-flow rate, the changes in temperature of the first end zone and the second end zone may be between 0.25 and 2.5 degrees centigrade. And the differences between those respective changes for the first end zone and the second end zone are much smaller than those numbers. There is a temperature gradient in the PTC material between the first end zone and the second end zone, but the actual difference in temperature between them may be in the range between 0.07 and 0.7 degree C. Small as these numbers may be, they still provide valuable data for output signals because of the multiplicative effect of the steep slope of the characteristic curve for PTC material. This is where the "gain" and the "leverage" come from.

The small magnitudes of the temperature changes, and of the differences between temperature changes, might lead one to wonder whether there is some way to increase the magnitudes of those numbers. The short answer to that query is that we don't need to increase the changes in temperature because of the steep slope of the characteristic curve of PTC material. This is the blessing of which my invention takes full advantage.

During operation of the sensor in accordance with my invention, a particular phenomenon is observable at all rates of flow of fluid past the sensor but is most noticeable during a change of direction of flow or during the transition from a state of zero flow to a state of finite flow.

So long as the state of zero flow of fluid persists, the rate of flow of heat from each zone or sector of the sensor to its environment remains quiescent. The rate of heat flow from each zone or sector to all other mass thermally coupled thereto is constant. But at the instant when fluid begins to move past the sensor, the thermal equilibrium is upset.

Referring to the "sculptured sensor" of FIG. 5, the temperature of first end zone 125 begins to be affected by incoming cooler fluid which had not been thermally coupled thereto, and warmed thereby, during the state of zero flow of fluid. When flow is initiated, the transfer of heat from first end zone 125 to that cooler fluid slightly lowers the temperature of first end zone 125 and its resistance. Consequently, the voltage $V_A$ across first resistor 129 is increased.

Correspondingly, downstream on the sensor and slightly later in time, the transfer of heat from second end zone 127 to the passing fluid decreases because the fluid passing second end zone 127 has been slightly heated by first end zone 125. Accordingly, the temperature of second end zone 127 rises slightly, and its electrical resistance also increases slightly. Thus the current through second resistor 131 decreases slightly, thereby lowering the voltage $V_B$ across it.

It is interesting to compare the effect of an increase in flow rate of the fluid with the effect of an increase in temperature thereof. We have just noted that an increase in flow rate of the fluid causes an increase in the voltage $V_A$ across first resistor 129 and a decrease in the voltage $V_B$ across second resistor 131. So, if $V_A$ and $V_B$ are being compared with each other to obtain a difference voltage, the effect of an increase in flow rate is to increase that difference voltage, thereby making it easier to measure.

But, as has been pointed out in an earlier paragraph, an increase in temperature of the fluid causes changes in the resistances of the respective zones or sectors of the sensor which are in the same direction, although not equal in magnitude. Therefore, any signal detection which depends upon the difference between $V_A$ and $V_B$ will be more difficult in the case of temperature than in the case of flow rate. Fortunately, as will be explained in subsequent paragraphs, both of those important quantities can be detected by a single multi-zone sensor, and without explicitly measuring the difference between $V_A$ and $V_B$.

Another interesting aspect of the transition from zero flow to a state of appreciable flow is that the transition produces "spikes" in the voltages $V_A$ and $V_B$ which are important in indicating sudden changes in the flow of fluid past the sensor. But this phenomenon is detectable and observable at all levels of fluid flow past the sensor.

Although it is impossible to specify, in advance, all the parameters for the design and installation of a multi-zone sensor, it is possible to point out several considerations that may apply. Perhaps the first consideration is the choice of PTC material for the sensor. Clearly, the PTC material should have a transition temperature such that the medium to be measured has a temperature of similar magnitude but lower. Keystone Carbon, and others, have formidable "menus" of PTC material to match applications ranging from below the freezing point to above the boiling point of water. Second, if the degree of coupling needs to be increased, consideration may be given to increasing the diameter of the tube or conduit so that the fluid passing therethrough will have a lower velocity and will be more closely coupled with the sensor from the standpoint of transfer of heat. Third, the mode of bonding of the sensor to the tube or conduit needs to be considered. In general, if more solder or thermal epoxy material is used, the thermal coupling is increased but the immediateness of response is decreased because of the added passive mass.

Figure 6:
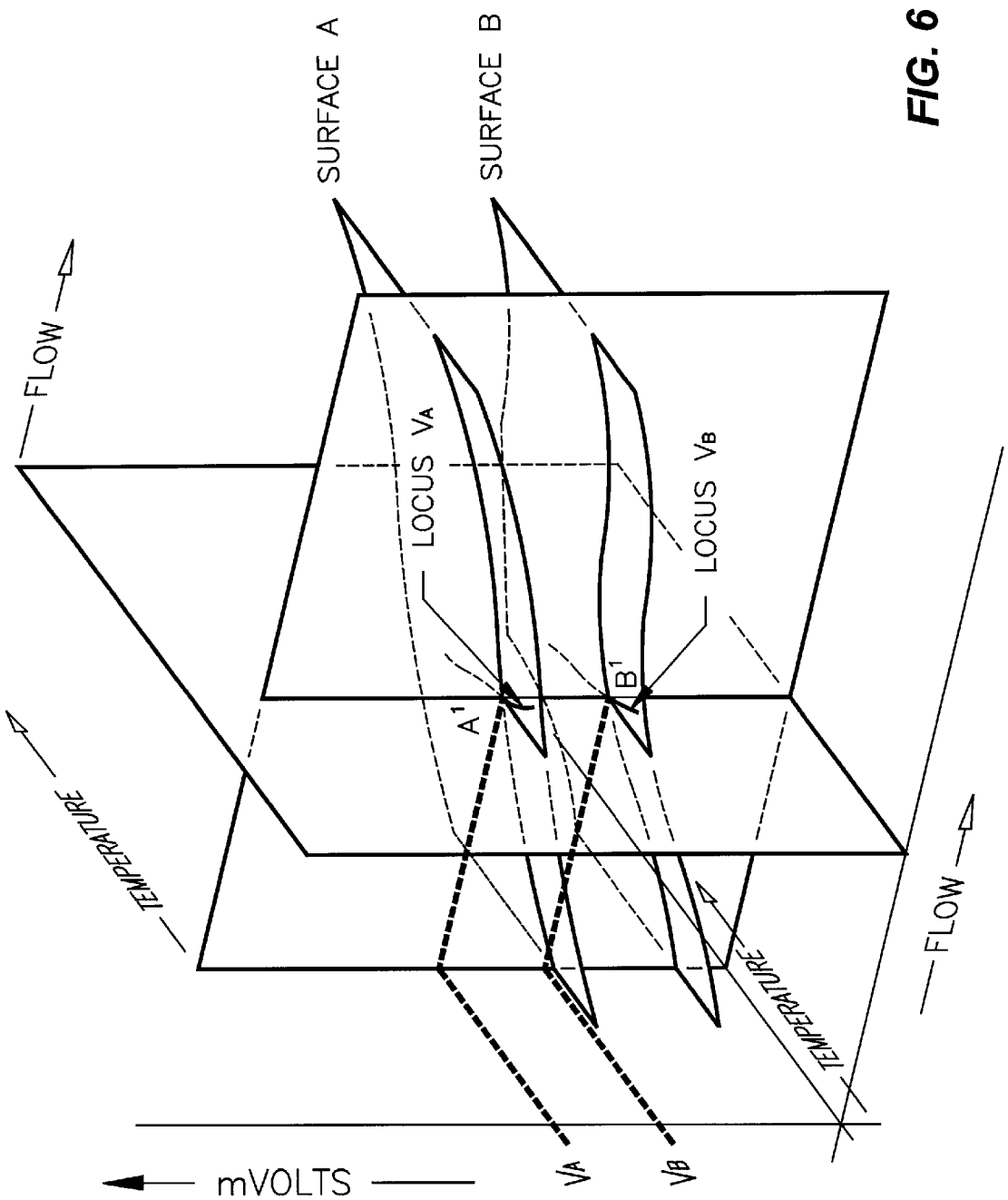
FIG. 6 is a three-dimensional graphical representation of the performance of a particular sensor having ZONES "A" and "B", and situated in a particular environment for the purpose of sensing and measuring the temperature and rate of flow of a fluid with which the sensor is in thermal communication. The voltage drops across respective external resistive elements are designated as "$V_A$" and "$V_B$"

Turning now to FIG. 6 of the drawings, we see a three-dimensional graphical representation of the performance of a particular sensor having zones "A" and "B", and situated in a particular environment. Two three-dimensional surfaces are shown, one for each of the end zones of the sensor of FIG. 4 and FIG. 5, for instance. The surfaces are plotted as functions of temperature and rate of flow of a fluid to which the sensor is thermally coupled. It is important to understand that FIG. 6 represents the performance of the totality of a given sensor, even though distinct "surfaces" are presented for two respective "end zones" or other distinct sensing elements.

In FIG. 6, two properties of the fluid in the tube or conduit associated with the sensor are plotted as respective "independent variables" along the "X" and "Y" axes of the representation. Plotted along the "Z" axis is a "dependent variable", namely the voltage drops across the external resistors such as first resistor 129 and second resistor 131 in FIG. 4 and FIG. 5. Thus, properties of the fluid are related, in FIG. 6, to respective voltage drops which are measured across external resistors of the sensor. FIG. 6 gives a direct correlation between the observable voltage drops (the "output signals"), and the temperature and flowrate properties of the fluid which are desired to be measured. FIG. 6 "characterizes" the whole sensor in its particular environment and relationship with the tube or conduit.

It is important to realize that the independent variable "temperature" in FIG. 6 is not a temperature difference "ΔT" with which we have been concerned in the discussion of FIG. 4 and FIG. 5. So the concept portrayed in FIG. 6 is new. The two surfaces plotted in FIG. 6 represent respective "loci" of output voltage drops across the external resistors associated with zone "A" and zone "B" of the sensor. There is no reason for the surfaces to be planar, nor is there any reason for them to be parallel. Of course, the surfaces may be considered to extend indefinitely in directions indicated by the "temperature" and "flow" axes respectively. The two orthogonal planes which are shown intersecting the "surfaces" merely define "loci" of constant temperature and constant flowrate respectively.

The placement and contours of the respective surfaces are determined empirically. Statistical analysis indicates that between 15 and 20"sampling points" are needed in order to characterize adequately each surface. That is to say, fifteen or twenty distinct combinations of fluid temperature and flowrate with respective voltage drops across the external resistors are needed in order to define with sufficient resolution the placement and contours of each surface.

At first, it is hard to believe that respective voltage drops across two external resistors can provide sufficient "information" to define uniquely the temperature and flowrate of the fluid in the tube or conduit. It would have been easier to believe that a particular combination of temperature and flowrate would be capable of defining uniquely two voltages. I have discovered that this unique relationship works both ways. That is one of the factors which make this invention important.

In contemplating FIG. 6, it does not at first appear that there is sufficient information to define fluid temperature and flowrate even when the measured voltage drops "$V_A$" and "$V_B$" across the respective external resistors for zone "A" and zone "B" are known. But then we remember that the respective flowrates past zone "A" and zone "B" are substantially the same, disregarding small changes in density of the fluid between those two zones. But even though we may justifiably disregard small changes in density, we may not similarly disregard small changes in temperature, which are of the essence in the performance of this invention. If flowrate is considered to be constant between the two zones of the sensor, the locus of possible output voltage drops becomes one line, in the plane of constant flow, on the respective "SURFACE A" and "SURFACE B" as portrayed in FIG. 6. Once again, there is no reason for either line to be straight—it merely represents a projection from a certain output voltage drop $V_A$ or $V_B$ onto SURFACE A or SURFACE B respectively.

But where those two probably-curved loci of constant voltage $V_A$ and $V_B$, respectively intersect a plane of constant flow, that point of intersection is the operating point of the sensor. This is a remarkable discovery. It is the subject of "method" claims in this patent specification. It enables two simple voltages, measured across two simple resistors, to determine uniquely two properties of a fluid which are often hard to distinguish. And it opens up the possibility of detecting or measuring other properties which are yet to be discussed in detail in this specification, such as the position of a mechanical component of a diaphragm valve.

For the purposes of discussion, we have assumed only a pair of output voltages, measured across a couple of resistors, respectively. We have assumed only two "surfaces," which have loci that intersect a plane of some constant property—flowrate in this case. But if we had three output voltages, one of those voltages would take the place of the plane of constant property, or be associated with a third parameter such as humidity or pressure.

The assumption of only two surfaces ("A" and "B") is based upon an underlying assumption that the direction of flow does not reverse. Of course, if the direction of flow did reverse, the two surfaces illustrated in FIG. 6 would be extended to the left. The extensions might be regarded as an additional pair of surfaces. In any event, they would have to be "characterized" by plotting a statistically sufficient number of "sample points", just as was done in characterizing Surfaces "A" and "B".

Figure 7:
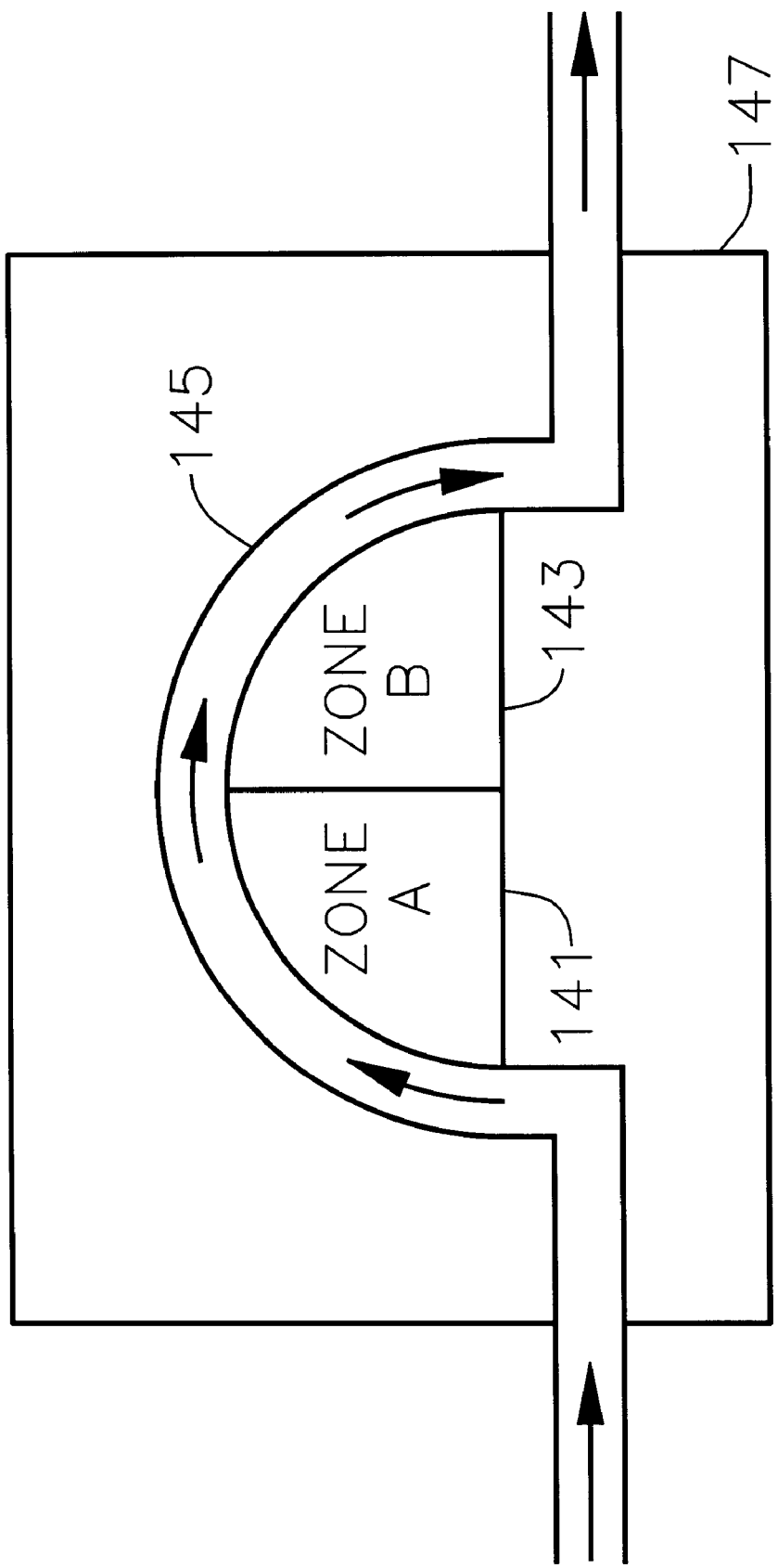
FIG. 7 is a representation of a sensor having zones "A" and "B" in which those zones of the PTC material are in thermal communication with a semi-circular channel through which a fluid is passed for the purpose of temperature and rate-of-flow measurement.

Turning to FIG. 7 of the drawings, we see a type of flow sensor having a commercial configuration. It is formed around a semicircular tablet of PTC material preferably having an ohmic layer bonded to each flat surface of the PTC material. The ohmic layer on one side of the PTC material is cut, or scored, so as to define a "ZONE A 141" and a "ZONE B 143," which are electrically disconnected from each other on only one surface of the PTC material. Each of the two zones is thus a quadrant-shaped sector. A thin-wall metal tube 145 is then bent around the curved portions of both sectors so that the tube makes equal physical contact with each zone. Suitable fittings are then connected to thin-wall metal tube 145 to allow fluid to flow through it for the purpose of being sensed and measured.

Figure 8:
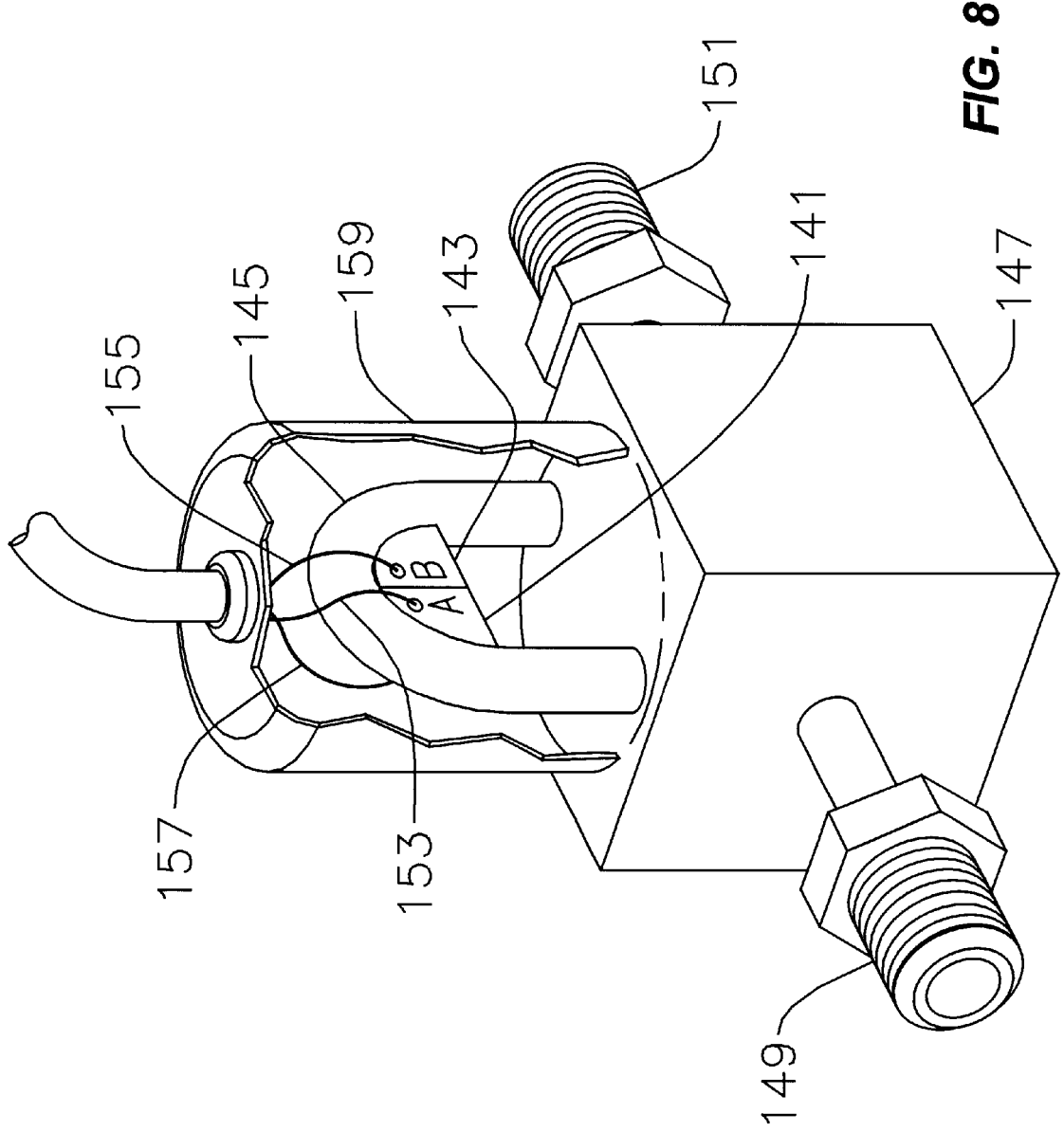
FIG. 8 is a perspective view, partially broken away, of a metering device incorporating a sensor such as that of FIG. 7.

FIG. 8 of the drawings shows a commercial metering device incorporating a sensor such as that of FIG. 7. Thin-wall metal tube 145 is mounted on a pedestal 147 and is connected to a first fitting 149 and a second fitting 151 for the respective inflow and outflow of fluid.

A first electrical lead 153 is connected to ZONE A 141 of the sensor, while a second electrical lead 155 is connected to ZONE B 143 of the sensor. A third electrical lead 157 is connected to the "base" ohmic material of the sensor and to an outside voltage source (not shown) which energizes the sensor. The sensor is enclosed by a cover 159 which may be "stuffed" with thermal insulating material if desired.

In operation, the commercial metering device of FIG. 8 is very similar to the sensor of FIG. 4 and FIG. 5. Fluid admitted to the device through first fitting 149 enters the "arch" of thin wall metal tube 145 and passes by ZONE A 141 and ZONE B 143 of the sensor in succession on the steep slope of the characteristic curve of FIG. 1. The thermal communication between the respective zones of the sensor and the fluid (through thin-wall metal tube 145) is very good. Accordingly, heat is transferred to the fluid from ZONE A 141 and ZONE B 143. But more heat is transferred from ZONE A 141 than ZONE B 143. The amount of heat transferred from both zones is more dependent on the temperature of the fluid. The difference between the two heat transfers is more dependent on the flowrate of the fluid.

Each of first electrical lead 153 and second electrical lead 155 is connected through a discrete resistor to ground. As in the circuit diagrams of FIG. 4 and FIG. 5, output signal voltages $V_A$ and $V_B$, respectively, are developed and measured across those two resistors. By sampling a statistically-sufficient number of combinations of values of $V_A$, $V_B$, fluid temperature, and fluid flowrate, a three-dimensional representation such as that of FIG. 6 can be prepared to "characterize" the performance of the commercial metering device. For each of the two surfaces of that representation, fifteen to twenty sample combinations may be required. When the two surfaces have been prepared, a pair of voltages $V_A$ and $V_B$ will be sufficient to "output" both the temperature and flowrate of the fluid. Again, it will be understood that the validity of the surfaces is for a particular sensor in a particular environment measuring a particular fluid. The temperature of the fluid should be less than that of the steep portion of the characteristic curves of ZONE A 141 and ZONE B 143, and the diameter of the tube should be such that moderate and smooth flow of the fluid takes place therethrough.

Figure 9:
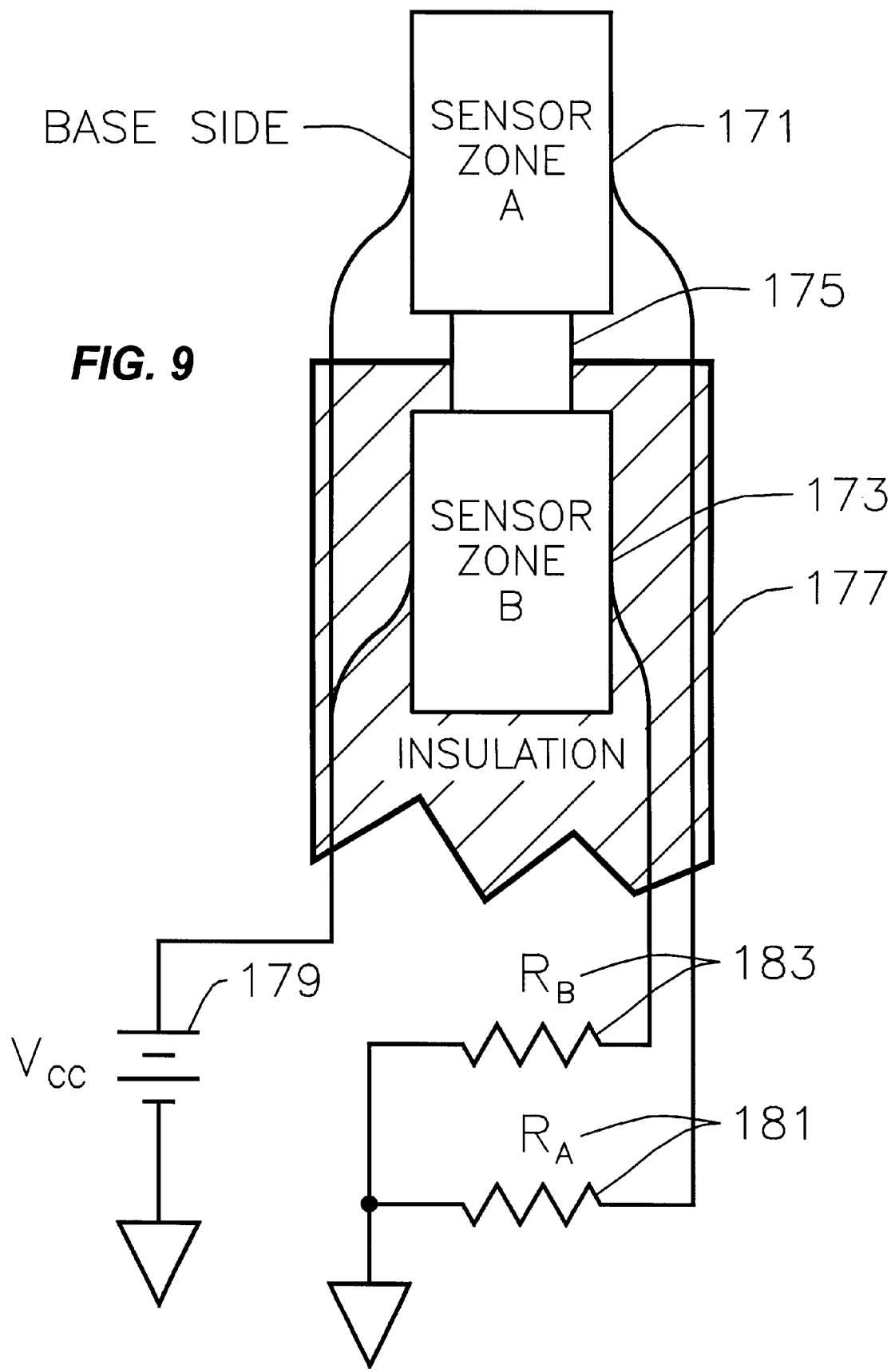
FIG. 9 is a representation, partially in section, of a wind-chill sensor having zones "A" and "B" in which Zone A is fully exposed to the atmosphere whereas Zone B is thermally insulated from ambient temperature and wind.

Proceeding on to FIG. 9 of the drawings, we see a wind-chill sensor having zones "A" and "B" in which zone A is fully exposed to the atmosphere whereas zone B is thermally insulated from ambient temperature and wind. Once again, we have a tablet or other body of PTC material formed into a sensor zone A—171 coupled to a sensor zone B—173 through a reduced section 175 of the PTC material. Sensor zone B—173 is shielded from wind by insulation 177, which may be a plastic foam or moldable plastic material, or some equivalent substance. A first side of each of sensor zone A—171 and sensor zone B—173 is connected to ground through a battery 179 or other voltage source, which energizes the sensor. A second side of sensor zone A—171 is connected to ground through a resistor $R_A$—181, while a second side of sensor zone B—173 is connected to ground through a resistor $R_B$—183.

In some embodiments of this invention which have been previously described, the equality of electric potential between the "base" sides of the respective zones of the sensor has been assured by leaving undisturbed the ohmic layer bonded to the "base side." This is in contrast to the scoring or separation of the ohmic layer on the side which is exposed to the different temperatures of the fluid or other medium to be measured. In the embodiment of FIG. 9, the equality of electric potential of the "base side" is assured by connecting the base side of both sensor zone A and sensor zone B to battery 179 by means of a single lead of high conductivity.

In view of the small magnitudes of the temperature differences, current differences, and voltage differences which comprise the signal data on which my sensors depend for successful operation, it is important that the potentials of the base sides of both sensor zones be maintained equal so as not to introduce voltage differentials that would degrade the already-small voltage differences which are essential for the accurate readout of temperature, flowrate, and other quantities, including position, which are the desired outputs of my invention.

As the wind-chill sensor is exposed to wind of varying temperature and velocity, sensor zone A and sensor zone B produce different voltage drops across their respective external resistors $R_A$—181 and $R_B$—183 because sensor zone A is fully exposed to the wind whereas sensor zone B is insulated from the wind.

The wind-chill sensor of FIG. 9 is useful in meteorological stations and in various industrial applications wherein knowledge of both temperature and flowrate is important. Once again, the plural—zone sensor of FIG. 9 makes possible the separate determination of those properties. Also, once again, the determination of those separate properties requires the "characterization" of each particular sensor in its particular environment. There is no "one size" of calibration curve which "fits all" wind-chill sensors in accordance with this invention. However, when sufficient data have been obtained from a "family" of similar sensors, modeling minimizes the need for calibration.

Figure 10:
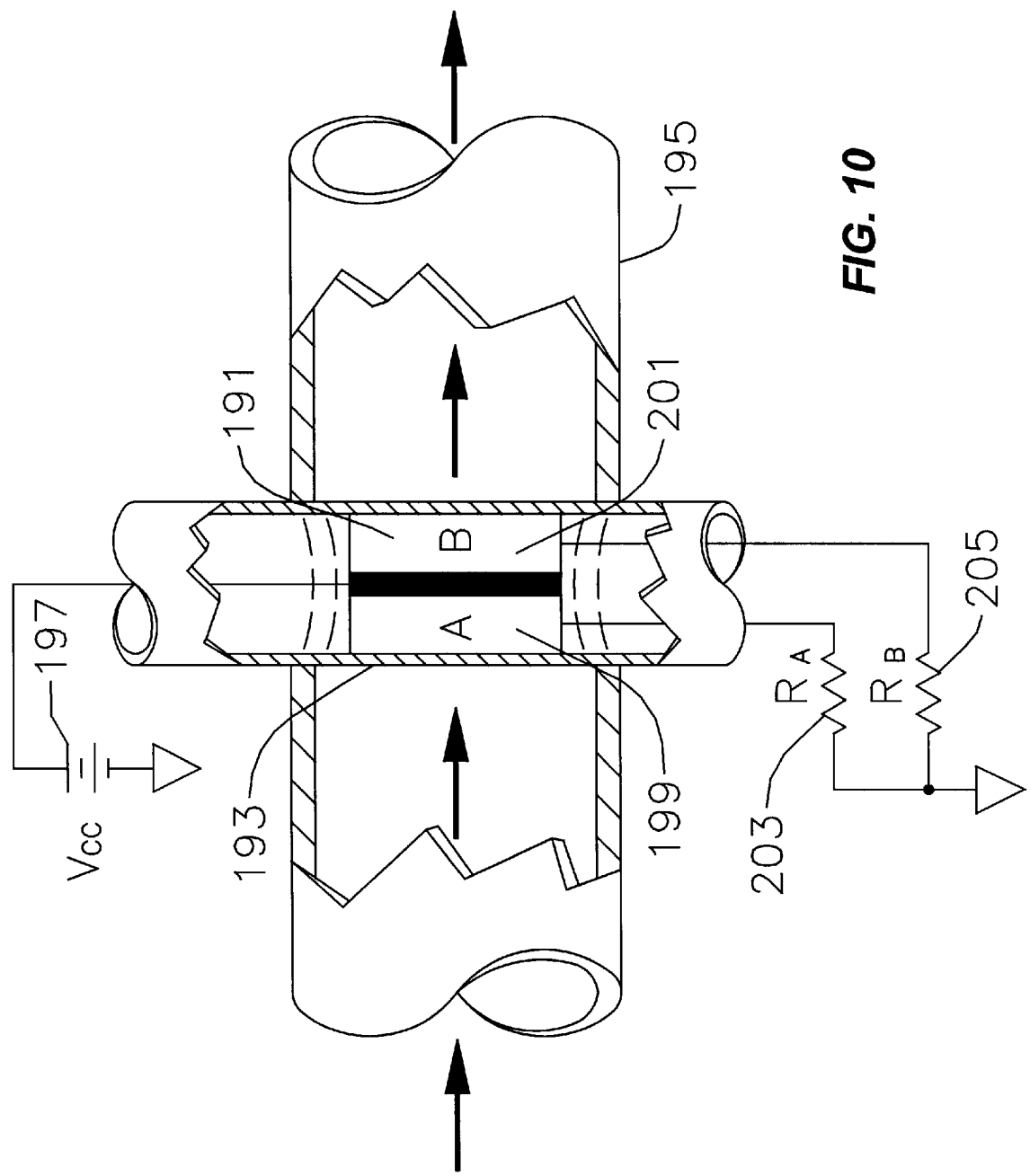
FIG. 10 is an elevation view, partly in section, of a flow-direction sensor employing the principles of this invention.
Figure 11:
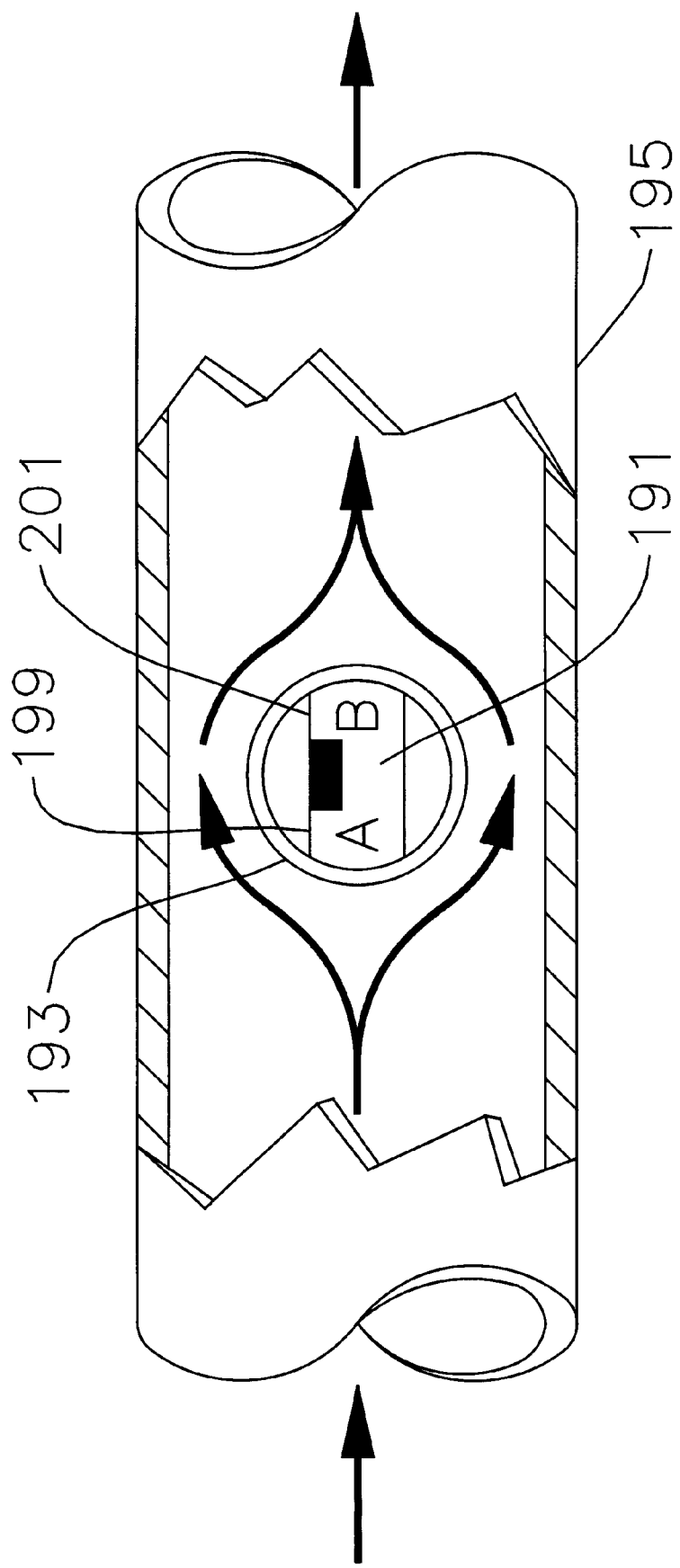
FIG. 11 is a top view, again partly in section, of the flow-direction sensor illustrated in FIG. 10.

The flow-direction sensor of FIG. 10 and FIG. 11 is another member of the "family" of sensors in accordance with my invention. However, it is concerned more with sensing direction of flow of a fluid than with measuring the flowrate and temperature of the fluid. Detection of direction of flow can be important in environmental apparatus such as a "clean room" where, if fluid flow is in the wrong direction, an alarm must be activated.

In the flow-direction sensor of FIG. 10 and FIG. 11, a bar 191 of PTC material is pressed into a metal tube 193 which is in turn mounted with its axis transverse to the longitudinal direction of a duct 195 through which fluid is flowing. The direction of that flow is to be established. In a manner similar to the construction of the other sensors of the family, bar 191 of PTC material is faced on two sides with respective layers of ohmic material. The layer of ohmic material on one side of the PTC material is left unbroken and is connected to a voltage source 197. The layer of ohmic material on the other side of the PTC material is scored lengthwise down its middle to define a zone A—199 and a zone B—201, which are in turn respectively connected through a resistor $R_A$—203 and a resistor $R_B$—205 to a fixed level of potential. Duct 195 confines the flow of fluid so that it can take place in only one of two directions. Metal tube 193 is a good conductor of heat. Since the PTC material is, once again, operated in its self-heating mode on the steep portion of its characteristic curve, it dissipates heat through the wall of metal tube 193 to the fluid flowing past it in duct 195. The zone of the sensor which is upstream in the fluid dissipates more heat to the fluid and, hence, is more cooled by it than is the zone which is positioned downstream. The resistance of the upstream zone is accordingly reduced more than that of the downstream zone, and the current through it and its respective series resistor is higher than that through the downstream zone. Once again, the respective voltages across the series resistors are measured to provide data for an output signal.

If only the direction of flow of the fluid is required, very little calibration of the sensor is necessary. On the other hand, if the temperature and flowrate of the fluid are to be determined, this sensor must be "characterized" in its particular environment by a sampling procedure similar to that which was described for the sensor of FIG. 4 and FIG. 5.

Figure 12:
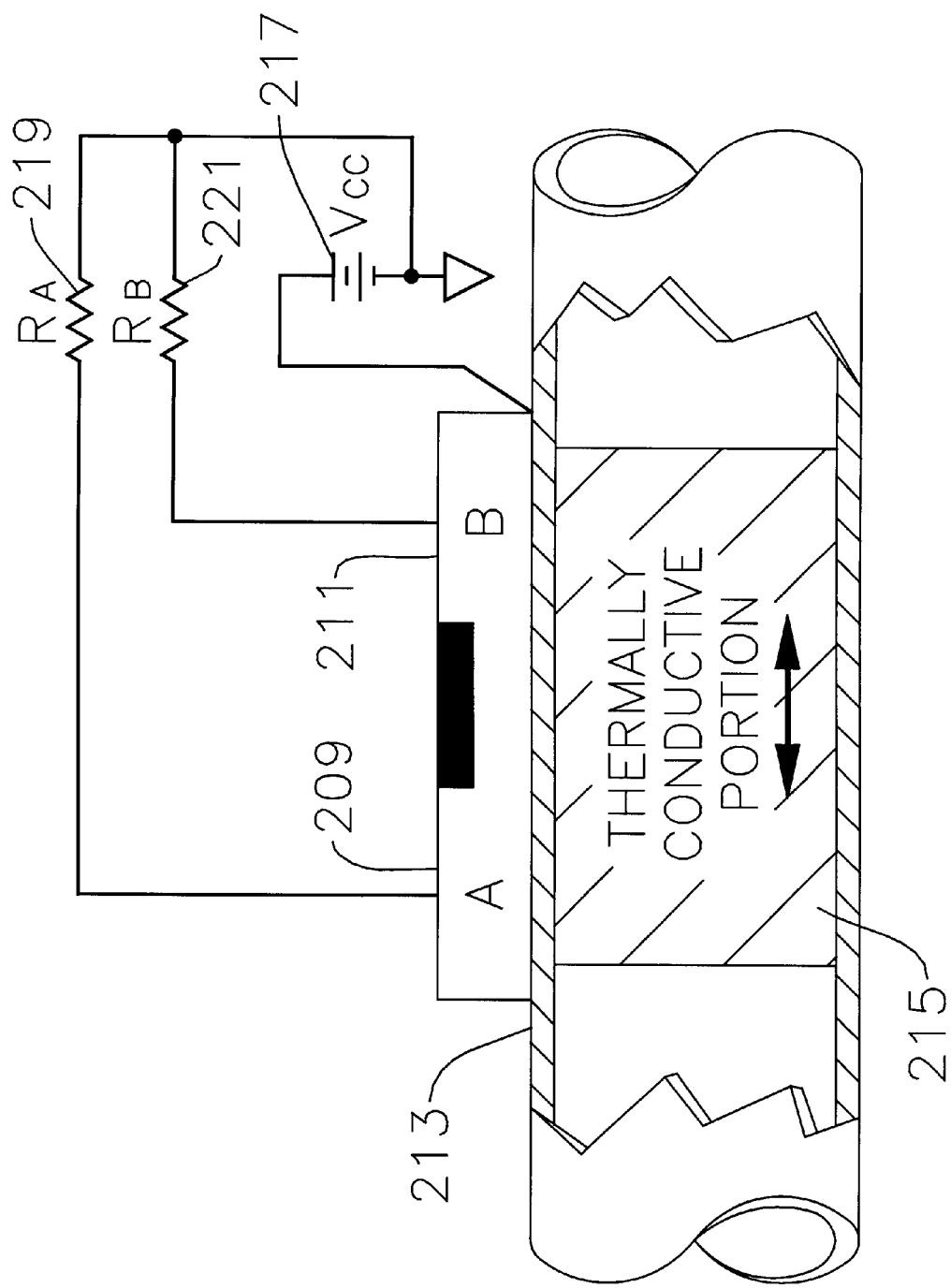
FIG. 12 is a schematic diagram, partly broken away and partly in section, of a position sensor employing the principles of this invention.
Figure 13:
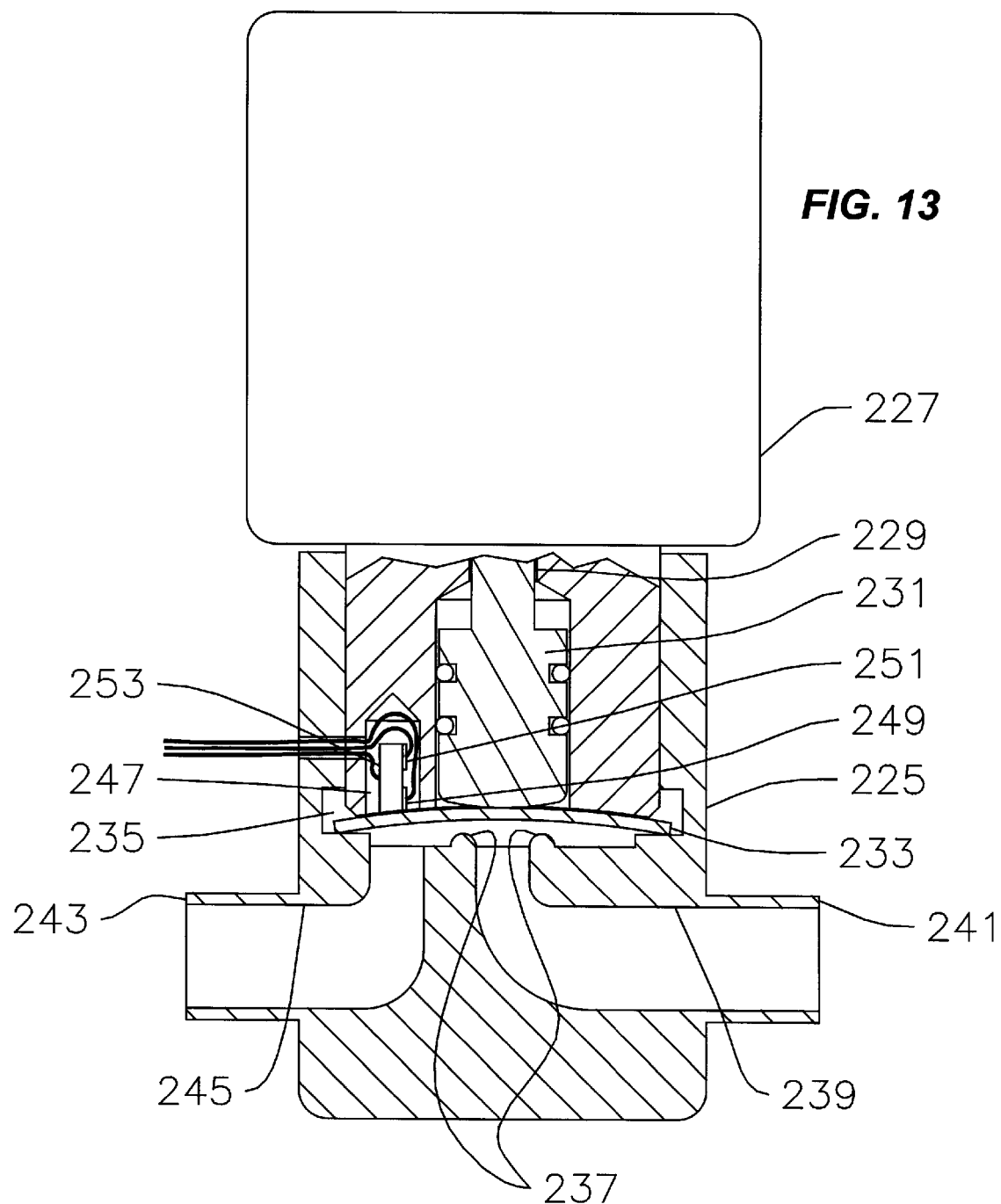
FIG. 13 is an elevation view, partly in section, of a portion of a diaphragm valve in which the position of the diaphragm is to be sensed by a sensor employing the principles of this invention.
Figure 14:
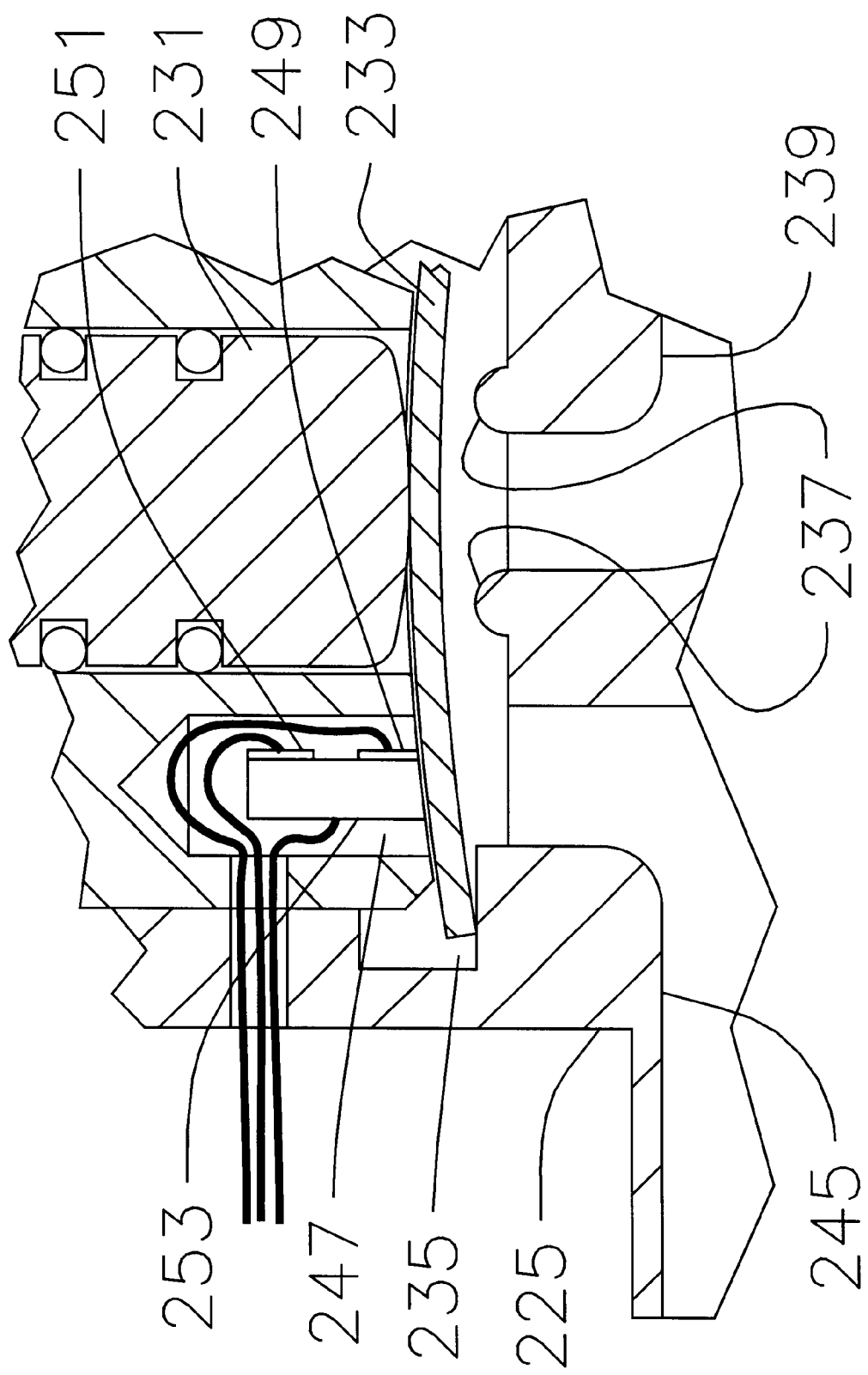
FIG. 14 is a sectional elevation view, on a larger scale, showing the way in which the PTC sensor of FIG. 13 interfaces with the diaphragm of the valve when the diaphragm is positioned so that the valve is open.
Figure 15:
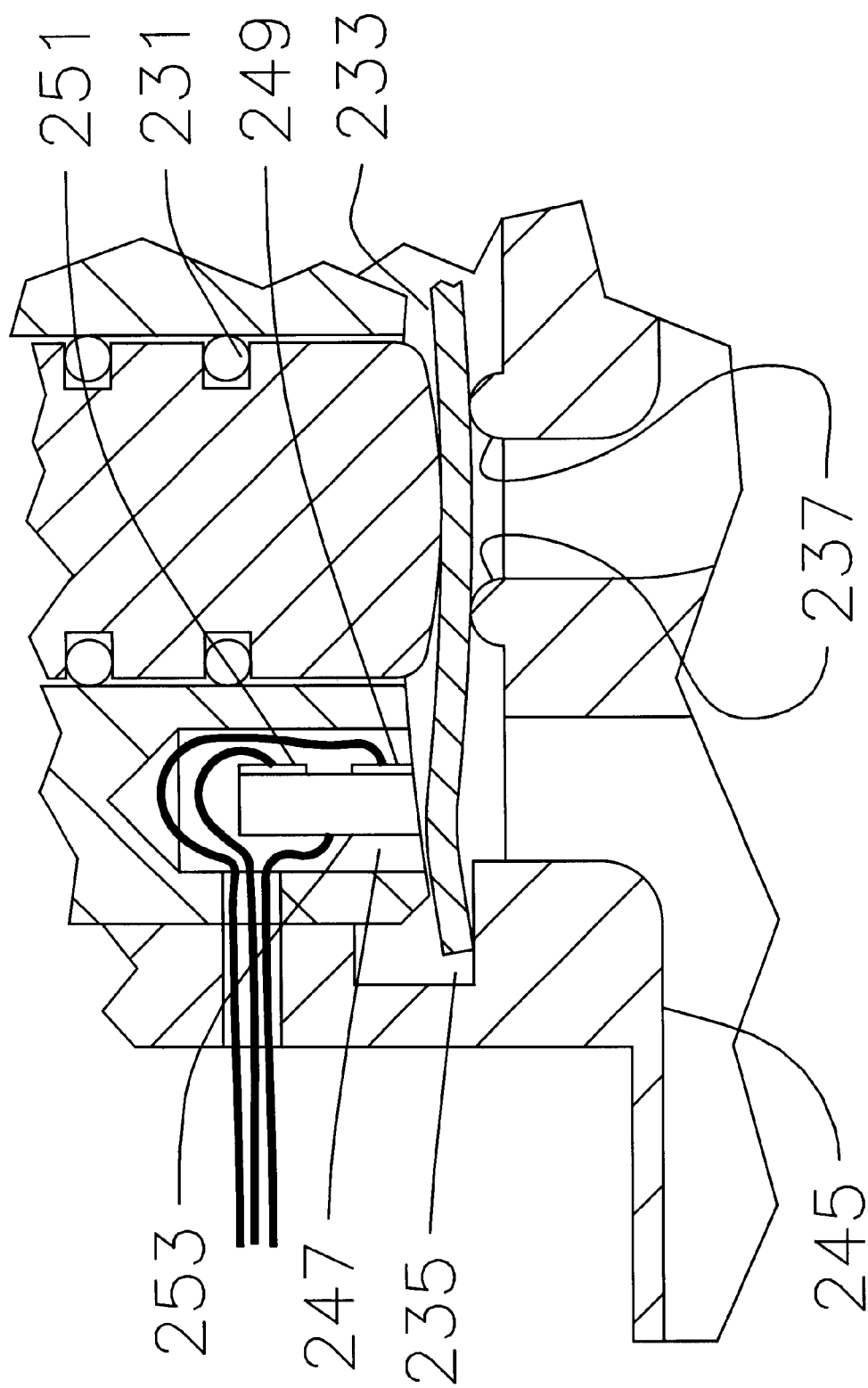
FIG. 15 is a sectional elevation view showing the way in which the PTC sensor of FIG. 13 is partially spaced from the diaphragm of the valve when the valve is closed.

The position sensor of FIG. 12 is a basic configuration which can be applied in many different ways to sense the position of a mechanical element or component in a piece of apparatus. In the discussion of FIG. 13, FIG. 14, and FIG. 15 of the drawings, it will be shown how this basic configuration can be applied in determining precisely the degree of "openness" (if any) of a valve such as a diaphragm valve. Another application is as a contact-less limit switch.

In FIG. 12, a piece of PTC material having a zone A—209 and a zone B—211 is thermally bonded to a pipe 213 within which is positioned a section of rod 215. If pipe 213 is cylindrical, the section of rod would also be cylindrical and would be in close thermal contact with the inner surface of pipe 213. Both pipe 213 and section of rod 215 should be good conductors of heat. Section of rod 215 is either the body whose position is to be sensed or is coupled mechanically to the body whose position is to be sensed.

The bonded interface between pipe 213 and the piece of PTC material represents the "base" of the sensor and is energized from an EMF 217. Zone A—209 is connected through an external resistor $R_A$—219 to a fixed level of potential, while zone B—211 is similarly connected through a resistor $R_B$—221 to a fixed level of potential, such as ground.

If section of rod 215 is somewhat shorter than the piece of PTC material, as shown in FIG. 12, its cooling effect upon the PTC material depends upon where the section of rod is positioned in pipe 213. If section of rod 215 moves to the left, more of it will be in a thermally conductive relationship with zone A—209 of the PTC material than with zone B—211. If section of rod 215 moves to the right in pipe 213, the converse will be true. Whichever zone of the PTC material is in thermal communication with more of section of rod 215 will be more cooled by it, will assume a condition of lower resistance, will conduct more current, and mill develop a higher voltage drop across its respective external resistor. Again, in order to be able to read out an explicit indication of the position of section of rod 215, it is necessary to characterize the sensor by taking a sufficient number of sample points correlating the position of section of rod 215 with the respective voltages developed across the external resistors 219 and 221.

FIG. 13 shows an entire diaphragm valve in which it is necessary to sense the position of the diaphragm at any particular time. The valve may be closed, partially open, or fully open. Very often, in industrial practice, it is necessary to avoid the partially-open state of the valve, or at least to know if the valve is partially open.

FIG. 14 and FIG. 15 represent, on a larger scale, the portion of a diaphragm valve in which a sensor in accordance with my invention detects the position of the diaphragm and, hence, provides information on the degree of "openness" of the valve. In many industrial situations, it has not been possible to make that determination on a continuous basis. My invention enables a continuous determination to be made.

FIG. 13 shows a valve comprising a valve body 225 and a bonnet 227 which together accommodate a stem 229 carrying at its lower end a plunger 231 that is adapted to slide up and down within the confines of an inner surface of valve body 225. Plunger 231 bears against the upper surface of a diaphragm 233 that is supported, but not tightly fixed, within a groove 235 formed in valve body 225. When stem 229 moves plunger 231 downward, diaphragm 233 is forced into contact with, and seals, a circular seat 237 formed within valve body 225 at the head of an outlet channel 239 leading to an outlet port 241 of the valve. Fluid is admitted to the valve through an inlet port 243 and an inlet channel 245 which terminates below diaphragm 233. When diaphragm 233 is in close contact with, and sealing, seat 237, fluid from inlet channel 245 is not allowed to pass through seat 237 into outlet channel 239. However, when plunger 231 is not forcing diaphragm 233 into contact with seat 237, fluid from inlet channel 245 passes through the gap between diaphragm 233 and seat 237, and on through outlet channel 239 to outlet port 241. Various mechanisms are available for moving stem 229 up and down to effect the desired control over fluid supplied to inlet port 243 and to be outputted—or not outputted—from outlet port 241.

Accommodated within a leakage chamber 247 or otherwise within valve body 225 is a position sensor similar to that which is illustrated in FIG. 12 except that the position sensor of FIG. 13 is not bonded to a pipe in which there is a section of rod of a thermally-conductive material. Instead, a first zone 249 of the sensor is arranged to interface closely with diaphragm 233 when diaphragm 233 is spaced from seat 237, but not when diaphragm 233 is in sealing relationship with seat 237. Thus, when diaphragm 233 is in contact with the entire end face of first zone 249, seat 237 is not sealed by diaphragm 233, and the valve is free to conduct fluid from inlet port 243 to outlet port 241. In order to facilitate contact, the end face of first zone 249 may be formed at an oblique angle, rather than normal to the longitudinal axis of the sensor. This oblique angle is clearly shown in each of FIG. 14 and FIG. 15.

When diaphragm 233 is not in contact with the entire end face of first zone 249, flow of fluid through the valve is to some extent restricted. When diaphragm 233 does not contact at all the end face of first zone 249, as illustrated in FIG. 15, the valve is closed, and no fluid can pass through it from inlet port 243 to outlet port 241.

The sensor also includes a second zone 251 which is not disposed to come into physical contact with diaphragm 233 or with any other solid, heat-conductive material other than its "base" and its PTC-material bridge to first zone 249. Accordingly second zone 251 does not transfer heat to its environment at a rate which varies appreciably as a function of the position or condition of any external solid element. The rate of heat transfer from second zone 251 to its environment is essentially stable, whatever the degree of "openness" of the valve.

By contrast, the rate of heat transfer from first zone 249 to diaphragm 233 is intensely dependent upon the degree of contact between diaphragm 233 and the end face of first zone 249. That is to say, the rate of heat transfer from first zone 249, and hence its temperature, are closely related functions of the degree of openness of the valve. As with the position sensor of FIG. 12, the sensor of FIG. 13, FIG. 14, and FIG. 15 has a base 253 which is energized from a source of steady voltage, not shown. Further, first zone 249 and second zone 251 are connected through respective resistive elements, not shown, to ground or some other point of constant potential level. Accordingly, when the valve opens, diaphragm 233 approaches close contact with the end face of first zone 249, which is warmer than diaphragm 233. Thus, more heat is transferred from first zone 249 to diaphragm 233, and the temperature of first zone 249 falls, thereby lowering its resistance and increasing the current through it and its external resistive element. Consequently, the voltage across that resistive element increases as compared with the voltage across the resistive element connected in series with second zone 251.

As in the case of the position sensor of FIG. 12, the respective voltages across the external resistive elements in series with first zone 249 and second zone 251 can be statistically sampled and used to prepare a surface that characterizes the position of diaphragm 233 as a function of the two voltages. Accordingly, I have provided a sensor capable of uniquely characterizing temperature and rate of fluid flow, but I have also provided a useful device for sensing the position of a mechanical element in a commonly-employed piece of process-control apparatus such as a diaphragm valve.

It will be understood that the position of diaphragm 233 can readily be correlated with the rate of fluid flow through the valve of which diaphragm 233 is an important part. Therefore, the sensor in accordance with my invention furnishes still another means for measuring the rate of fluid flow, through the intermediary mechanical element of the diaphragm.

Although a full disclosure and discussion of the various aspects of the apparatus and operation thereof in accordance with my invention have been presented in the foregoing paragraphs, it is possible that certain variations thereof can be made in the future without departing from the scope of my invention. Accordingly, the scope of my invention is defined in the following claims, which cover the elements of my invention and equivalents thereof.

I claim:

1. A sensor for at least one property of a fluid, said sensor comprising:
   (a) a single body of positive-temperature-coefficient material,
   (b) said body being circular in configuration and having a first side and a second side,
   (c) said body having within it a first zone, a second zone, and a third zone, each of said zones having a sectoral cross section and being adjacent to both said first side and said second side of said body,
   (d) said zones being in direct electrical communication with one another only through said body,
   (e) the Curie transition temperature of said material of said body being higher than the temperature of said fluid,
   (f) a source of steady electric potential,
   (g) means for applying said steady electrical potential to said first side of said body,
   (h) means for thermally coupling one of said sides of said body to said fluid, and
   (i) first, second and third resistive means for connecting respective ones of said first, second, and third zones to points of electric potential different from said steady electric potential,
   (j) said first, second, and third resistive means being adapted to furnish respective voltage signals.

2. A sensor in accordance with claim 1 in which said sectoral cross section of each of said three zones subtends 120 degrees of arc.

* * * * *